United States Patent
Chao et al.

(10) Patent No.: US 9,361,889 B2
(45) Date of Patent: Jun. 7, 2016

(54) LANDMARK BASED POSITIONING WITH VERBAL INPUT

(71) Applicant: QUALCOMM Incorporated, San Diego, CA (US)

(72) Inventors: Hui Chao, San Jose, CA (US); Saumitra Mohan Das, Santa Clara, CA (US); Eric K. Holm, Santa Clara, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 364 days.

(21) Appl. No.: 13/752,628

(22) Filed: Jan. 29, 2013

(65) Prior Publication Data

US 2014/0214427 A1    Jul. 31, 2014

(51) Int. Cl.
| | |
|---|---|
| *G10L 19/00* | (2013.01) |
| *G10L 15/30* | (2013.01) |
| *G10L 15/22* | (2006.01) |
| *G01C 21/20* | (2006.01) |

(52) U.S. Cl.
CPC .............. *G10L 15/30* (2013.01); *G01C 21/206* (2013.01); *G10L 15/22* (2013.01)

(58) Field of Classification Search
CPC ..................................................... G10L 15/22
See application file for complete search history.

(56) References Cited

U.S. PATENT DOCUMENTS

| | | | |
|---|---|---|---|
| 5,956,684 A * | 9/1999 | Ishii et al. ...................... 704/275 |
| 6,281,811 B1 | 8/2001 | Ranzino | |
| 6,313,786 B1 * | 11/2001 | Sheynblat et al. ........ 342/357.23 |
| 6,522,889 B1 | 2/2003 | Aarnio | |
| 6,546,368 B1 * | 4/2003 | Weninger et al. .............. 704/270 |
| 2002/0133289 A1 * | 9/2002 | Miyaki ..................... G01C 1/36 701/400 |
| 2003/0176965 A1 * | 9/2003 | Padmanabhan ............... 701/207 |
| 2006/0020468 A1 * | 1/2006 | Hilliard .......................... 704/270 |
| 2006/0074660 A1 * | 4/2006 | Waters et al. .................. 704/251 |
| 2009/0006077 A1 * | 1/2009 | Keaveney .......................... 704/9 |
| 2009/0201176 A1 * | 8/2009 | Shimada ................ G01C 21/20 340/944 |
| 2009/0306961 A1 * | 12/2009 | Li et al. .............................. 704/9 |
| 2010/0052903 A1 * | 3/2010 | Tiwari et al. ................... 340/541 |
| 2010/0106662 A1 | 4/2010 | Ramaswamy | |
| 2010/0125409 A1 | 5/2010 | Prehofer | |

(Continued)

OTHER PUBLICATIONS

International Preliminary Report on Patentability—PCT/US2014/010949, The International Bureau of WIPO—Geneva, Switzerland, Dec. 18, 2014, 7 pgs.

(Continued)

*Primary Examiner* — Brian Albertalli
(74) *Attorney, Agent, or Firm* — Hunter Clark PLLC

(57) ABSTRACT

Disclosed are systems, apparatus, devices, methods, computer program products, and other implementations, including a method that includes determining at a mobile device whether verbal input from a user is required to determine position of location of the user. The method also includes, in response to a determination that the verbal input from the user is required to determine the position of the location of the user, obtaining at the mobile device verbal description data representative of one or more geographic features viewable by the user from the location of the user, identifying at the mobile device the one or more of the geographic features from the obtained verbal description data, and determining, at the mobile device, positioning information for the location of the user based, at least in part, on the one or more geographic features identified from the verbal description data.

53 Claims, 9 Drawing Sheets

(56) References Cited

U.S. PATENT DOCUMENTS

| | | |
|---|---|---|
| 2010/0235091 A1 | 9/2010 | Das et al. |
| 2011/0077852 A1* | 3/2011 | Ragavan et al. .............. 701/201 |
| 2012/0072100 A1 | 3/2012 | Mate et al. |

OTHER PUBLICATIONS

International Search Report and Written Opinion—PCT/US2014/010949—ISA/EPO—Jul. 29, 2014, 8 pgs.

* cited by examiner

LANDMARK BASED POSITIONING WITH VERBAL INPUT

BACKGROUND

One technique to facilitate location determination is based on detecting visual cues. A user may capture those visual cues through an image capturing device/unit (e.g., camera) and apply to the captured image computer vision processing to, for example, match these visual cues with location-known landmarks.

Use of image data to facilitate location determination tends to require large computational resources. Additionally, some devices may not be equipped with an image-capturing device. Furthermore, there may be some situations where the user, or device whose location needs to be determined is located remotely from the device on which location determination procedures are performed, thus making it difficult to perform the location-determination process based on captured image data.

SUMMARY

In some variations, a method is disclosed. The method includes determining at a mobile device whether verbal input from a user is required to determine position of location of the user. The method also includes, in response to a determination that the verbal input from the user is required to determine the position of the location of the user, obtaining at the mobile device verbal description data representative of one or more geographic features viewable by the user from the location of the user, identifying at the mobile device the one or more of the geographic features from the obtained verbal description data, and determining, at the mobile device, positioning information for the location of the user based, at least in part, on the one or more geographic features identified from the verbal description data.

Embodiments of the method may include at least some of the features described in the present disclosure, including one or more of the following features.

The method may further include identifying from verbal data received at the mobile device a verbal expression indicating a request to determine the location of the user.

Determining the positioning information for the location of the user may include comparing at least one of the identified one or more geographic features to assistance data stored at the mobile device.

The assistance data may include one or more of, for example, geographic features available in one or more geographic areas, positioning information for the geographic features, and/or geographic orientations of the geographic features.

The verbal description data may include one or more of, for example, text-based description data, and/or voice-based description data.

Identifying the one or more geographic features may include identifying at least one verbal expression included with the verbal description data, the at least one verbal expression indicating inclusion of the one or more geographic features in the verbal description data.

Obtaining the verbal description data representative of the one or more geographic features may include prompting the user to provide the verbal description data in response to the determination that the verbal input to determine the position of the location of the user is required, and receiving from the user the verbal description data representative of the one or more geographic features.

Prompting the user to provide the verbal description data may include determining amount of the verbal description data required to determine the position of the location of the user based on position uncertainty associated with an initial position determination for the location of the user, and prompting the user to provide the verbal description data in accordance with the determined required amount of the verbal description data.

The verbal description data may at least one of, for example, the one or more geographic features viewable from the geographical location, and/or relationship between at least one of the one or more geographic features and another of the one or more geographic features.

Determining the positioning information for the location of the user may include identifying one or more visibility regions in which the location of the user could be located, and progressively refining the identified one or more visibility regions based on additionally received data corresponding to the location of the user.

Determining whether verbal input from the user is required to determine the position of the location of the user may include determining whether verbal input from the user is required based on uncertainty associated with an initial location estimation for the location of the user.

The method may further include determining the initial location estimation based on one or more of, for example, signals received from one or more remote transmitters, and/or data obtained from measurements performed by one or more sensors of the mobile device.

Determining whether verbal input from the user is required based on the uncertainty associated with the initial location estimation for the location of the user may include one or more of, for example, determining whether number of access points from which signals to determine the initial location estimation are received is smaller than a pre-determined access point threshold, determining whether a Horizontal Dilution Of Precision (HDOP) value calculated using the access points from which the signals are received is worse than a pre-determined HDOP threshold, determining whether an uncertainty region, associated with the initial location estimation, computed based on data from one or more inertial sensors of the mobile device exceeds a pre-determined uncertainty region threshold, and/or determining whether particles computed using a particle filter to determine the initial location estimation are split into a bimodal distribution.

Identifying at the mobile device the one or more of the geographic features from the obtained verbal description data may include applying natural language processing (NLP) to the obtained verbal description data to identify the one or more geographic features.

In some variations, a mobile device is disclosed. The mobile device includes one or more processors, and storage media comprising computer instructions. The computer instructions, when executed on the one or more processors, cause operations including determining at the mobile device whether verbal input from a user is required to determine position of location of the user, and, in response to a determination that the verbal input from the user is required to determine the position of the location of the user, obtaining at the mobile device verbal description data representative of one or more geographic features viewable by the user from the location of the user, identifying at the mobile device the one or more of the geographic features from the obtained verbal description data, and determining, at the mobile device, positioning information for the location of the user based, at least in part, on the one or more geographic features identified from the verbal description data.

Embodiments of the device may include at least some of the features described in the present disclosure, including at least some of the features described above in relation to the method.

In some variations, an apparatus is disclosed. The apparatus includes means for determining at a mobile device whether verbal input from a user is required to determine position of location of the user. The apparatus also includes means, used in response to a determination that the verbal input from the user is required to determine the position of the location of the user, including means for obtaining at the mobile device verbal description data representative of one or more geographic features viewable by the user from the location of the user, means for identifying at the mobile device the one or more of the geographic features from the obtained verbal description data, and means for determining, at the mobile device, positioning information for the location of the user based, at least in part, on the one or more geographic features identified from the verbal description data.

Embodiments of the apparatus may include at least some of the features described in the present disclosure, including at least some of the features described above in relation to the method and the device, as well as one or more of the following features.

The apparatus may further include means for identifying from verbal data received at the mobile device a verbal expression indicating a request to determine the location of the user.

The means for determining the positioning information for the location of the user may include means for comparing at least one of the identified one or more geographic features to assistance data stored at the mobile device.

The means for identifying the one or more geographic features may include means for identifying at least one verbal expression included with the verbal description data, the at least one verbal expression indicating inclusion of the one or more geographic features in the verbal description data.

The means for obtaining the verbal description data representative of the one or more geographic features may include means for prompting the user to provide the verbal description data in response to the determination that the verbal input to determine the position of the location of the user is required, and means for receiving from the user the verbal description data representative of the one or more geographic features.

The means for prompting the user to provide the verbal description data may include means for determining amount of the verbal description data required to determine the position of the location of the user based on position uncertainty associated with an initial position determination for the location of the user, and means for prompting the user to provide the verbal description data in accordance with the determined required amount of the verbal description data.

The means for determining the positioning information for the location of the user may include means for identifying one or more visibility regions in which the location of the user could be located, and means for progressively refining the identified one or more visibility regions based on additionally received data corresponding to the location of the user.

The means for determining whether verbal input from the user is required to determine the position of the location of the user may include means for determining whether verbal input from the user is required based on uncertainty associated with an initial location estimation for the location of the user.

The apparatus may further include means for determining the initial location estimation based on one or more of, for example, signals received from one or more remote transmitters, and/or data obtained from measurements performed by one or more sensors of the mobile device.

The means for determining whether verbal input from the user is required based on the uncertainty associated with the initial location estimation for the location of the user may include one or more of, for example, means for determining whether number of access points from which signals to determine the initial location estimation are received is smaller than a pre-determined access point threshold, means for determining whether a Horizontal Dilution Of Precision (HDOP) value calculated using the access points from which the signals are received is worse than a pre-determined HDOP threshold, means for determining whether an uncertainty region, associated with the initial location estimation, computed based on data from one or more inertial sensors of the mobile device exceeds a pre-determined uncertainty region threshold, and/or means for determining whether particles computed using a particle filter to determine the initial location estimation are split into a bimodal distribution.

The means for identifying at the mobile device the one or more of the geographic features from the obtained verbal description data include means for applying natural language processing (NLP) to the obtained verbal description data to identify the one or more geographic features.

In some variations, a processor readable media programmed with a set of instructions executable on a processor that, when executed, cause operations including determining at a mobile device whether verbal input from a user is required to determine position of location of the user. The instructions cause further operations, in response to a determination that verbal input from the user is required to determine the position of the location of the user, including obtaining at the mobile device verbal description data representative of one or more geographic features viewable by the user from the location of the user, identifying at the mobile device the one or more of the geographic features from the obtained verbal description data, and determining, at the mobile device, positioning information for the location of the user based, at least in part, on the one or more geographic features identified from the verbal description data.

Embodiments of the processor-readable media may include at least some of the features described in the present disclosure, including at least some of the features described above in relation to the method, device, and apparatus.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C"

includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

BRIEF DESCRIPTION OF THE DRAWING

Like reference symbols in the various drawings indicate like elements.

DESCRIPTION

To make landmark-based positioning more robust and ubiquitous, the methods, devices, systems, products, and other implementations described herein expand the way of obtaining visual cues with other types of inputs. For example, a user may provide landmark information through voice or text inputs to facilitate positioning functionality. A user may provide such speech-based input as "I see GAP, APPLE, Nordstrom," and based on that input a system (e.g., processor-based system that may be implemented using a mobile device) is configured to estimate the user's position. Because verbal inputs from the user to enable determination of the position of the user's location results in an interruption to the user's activities, requesting verbal input (e.g., verbal description data representative of landmarks viewable from the user's location) from the user should be made as infrequently as possible (e.g., the user should generally be asked to provide verbal input only when such information is necessary). To the extent that verbal input from the user is required, the amount of verbal input requested and received from the user should be limited so that, for example, just enough verbal input is obtained from the user to enable determination of the user's position with an acceptable error/uncertainty value.

Thus, disclosed herein are methods, devices, systems, apparatus, products, and other implementations, including a method that includes determining at a mobile device whether verbal input from a user is required to determine position of location of a user, and, in response to a determination that verbal input from the user is required to determine the position of the location of the user, obtaining at the mobile device verbal description data representative of one or more geographic features viewable by the user from the location of the user, identifying at the mobile device the one or more of the geographic features from the obtained verbal description data, and determining, at the mobile device, positioning information for the location of the user based, at least in part, on the one or more geographic features identified from the verbal description data. In some embodiments, determining the positioning information for the location of the user may include comparing at least one of the identified one or more geographic features to assistance data stored at the mobile device (in other words, determination of positioning information can be performed on the mobile device and does not require communicating with a remote device or server to facilitate positioning determination processing).

Figure 1:
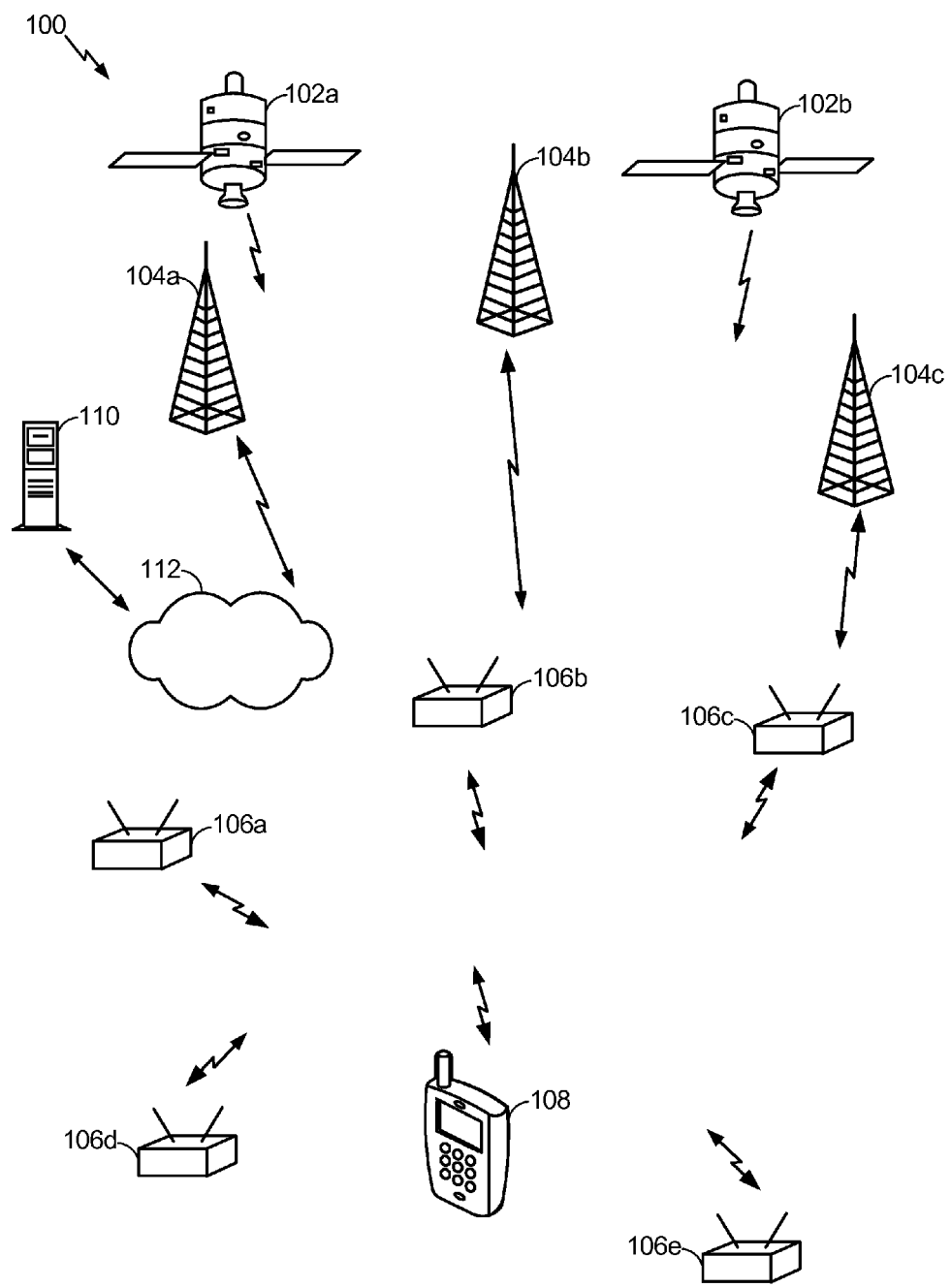
FIG. 1 is a schematic diagram of an example operating environment in which a mobile device may operate.

With reference to FIG. 1, shown is a schematic diagram of an example operating environment 100 in which a mobile device 108, e.g., a mobile device configured to perform location determination facilitated, in part, by verbal input, operates. The mobile device (also referred to as a wireless device or as a mobile station) 108 may be configured, in some embodiments, to operate and interact with multiple types of other communication systems/devices, including local area network devices (or nodes), such as WLAN for indoor communication, femtocells, Bluetooth-based transceivers, and other types of indoor communication network nodes, wide area wireless network nodes, satellite communication systems, etc., and as such the mobile device 108 may include one or more interfaces to communicate with the various types of communications systems. As used herein, communication system/devices with which the mobile device 108 may communicate are also referred to as access points (AP's).

As noted, and as will be discussed in greater detail below, the mobile device is configured to determine a position of a user (e.g., operator of the mobile device) based on verbal input provided by the user. In some embodiments, a determination may be made that location of the user (or device) cannot be accurately determined using processes and techniques that are based on signals obtained from remote devices/elements (e.g., based on satellite positioning signals, based on signals from WLAN or WWAN access points, etc.), based on measurements by on-board sensors of the device, and/or based on other location determination techniques. For example, the user whose location is to be determined may not even be located proximate to the device (e.g., an operator of the device may be attempting to help a friend not carrying a device capable of performing location determination to ascertain the friend's geographic location), or the device may not be receiving signals from enough remote transmitters to enable a sufficiently accurate location determination. Under such circumstances, direct assistance from the user through verbal input (e.g., text-based or voice-based) provided by the user may enable more accurate position location determination of the user's location. Thus, the device 108 may be configured to, in response to a determination that verbal input from the user is required to determine the position of the location of the user, obtain at the device verbal description data representative of one or more geographic features (e.g., landmarks) viewable by the user from the location of the user. For example, the user may be prompted to identify what store fronts, or other landmarks, are currently visible to the user. The device 108 may further be configured to (in response to the determination that verbal input is required) identify at the device the one or more of the geographic features from the obtained verbal description data (e.g., by employing speech recognition and natural language processing when the verbal input is voice-based input), and determine, at the device, positioning information for the location of the user based, at least in part, on the one or more geographic features identified from the verbal description data.

As noted, the environment 100 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth transceivers, cellular base stations, WiMax transceivers, etc. Thus, for example, and with continued reference to FIG. 1, the environment 100 may include Local Area Network Wireless Access Points (LAN-WAPs) 106a-e that may be used for wireless voice and/or data communication with the mobile device 108. The LAN-WAPs 106a-e may also be utilized, in some embodiments, as independents sources of position data, e.g., through implementation of multilateration-based procedures based, for example, on time of arrival techniques. The LAN-WAPs 106a-e can be part of a Wireless Local Area Network (WLAN), which may operate in buildings and perform communications over smaller geographic regions than a WWAN. Additionally in some embodiments, the LAN-WAPs 106a-e could also be pico or femto cells. In some embodiments, the LAN-WAPs 106a-e may be part of, for example, WiFi networks (802.11x), cellular piconets and/or femtocells, Bluetooth Networks, etc. The LAN-WAPs 106a-e can also include a Qualcomm indoor positioning system (QUIPS™). A QUIPS implementation may, in some embodiments, be configured so that a mobile device can communicate with a server that provides the device with data (such as to provide the assistance data, e.g., maps, RF heatmaps, connectivity information, etc.) for a particular floor or some other region where the mobile device is located. Although five (5) LAN-WAP access points are depicted in FIG. 1, any number of such LAN-WAP's may be used, and, in some embodiments, the environment 100 may include no LAN-WAPs access points at all, or may include a single LAN-WAP access point. Furthermore, each of the LAN-WAPs 106a-e depicted in FIG. 1 may be a moveable node, or may be otherwise capable of being relocated.

As further shown in FIG. 1, the environment 100 may also include a plurality of one or more types of Wide Area Network Wireless Access Points (WAN-WAPs) 104a-c, which may be used for wireless voice and/or data communication, and may also serve as another source of independent information through which the mobile device 108 may determine its position/location. The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-104c within the WWAN may operate from fixed positions, and provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP. Additionally, each of the WAN-WAPs 104a-c depicted in FIG. 1 may be a moveable node, or may otherwise be capable of being relocated.

Communication to and from the mobile device 108 (to exchange data, enable position determination of the device 108, etc.) may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be implemented, at least in part, using an IEEE 802.11x network, and a WPAN may be a Bluetooth network, an IEEE 802.15x, or some other type of network. The techniques described herein may also be used for any combination of WWAN, WLAN and/or WPAN.

When deriving position using the access points 104a-b and/or 106a-e, the mobile device 108 may utilize time of arrival techniques, optionally with the assistance of a positioning server 110 and a network 112. The positioning server (also referred to as a location manager) 110 may communicate with the mobile device 108 through the network 112.

In some embodiments, and as further depicted in FIG. 1, the mobile device 108 may also be configured to at least receive information from a Satellite Positioning System (SPS) 102a-b, which may be used as an independent source of position information for the mobile device 108. The mobile device 108 may thus include one or more dedicated SPS receivers specifically designed to receive signals for deriving geo-location information from the SPS satellites. Thus, in some embodiments, the mobile device 108 may communicate with any one or a combination of the SPS satellites 102a-b, the WAN-WAPs 104a-c, and/or the LAN-WAPs 106a-e. In some embodiments, each of the aforementioned systems can provide an independent information estimate of the position for the mobile device 108 using different techniques. In some embodiments, the mobile device may combine the solutions derived from each of the different types of access points to improve the accuracy of the position data.

In embodiments in which the mobile device 108 can receive satellite signals, the mobile device may utilize a receiver (e.g., a GNSS receiver) specifically implemented for use with the SPS to extract position data from a plurality of signals transmitted by SPS satellites 102a-b. Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

In some embodiments, the techniques/procedures presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As used herein, a mobile device or station (MS) refers to a device such as a cellular or other wireless communication device, personal communication system (PCS) device, personal navigation device (PND), Personal Information Manager (PIM), Personal Digital Assistant (PDA), a tablet device, a laptop or some other suitable mobile device which may be capable of receiving wireless communication and/or navigation signals, such as navigation positioning signals. The term "mobile station" (or "mobile device") is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile station" is intended to include all devices, including wireless communication devices, computers, laptops, tablet, etc., which are capable of communication with a server, such as via the Internet, WiFi, or other network, regardless of whether satellite signal reception, assistance data reception, and/or position-related processing occurs at the device, at a server, or at another device associated with the network. Any operable combination of the above are also considered a "mobile station."

Figure 2:
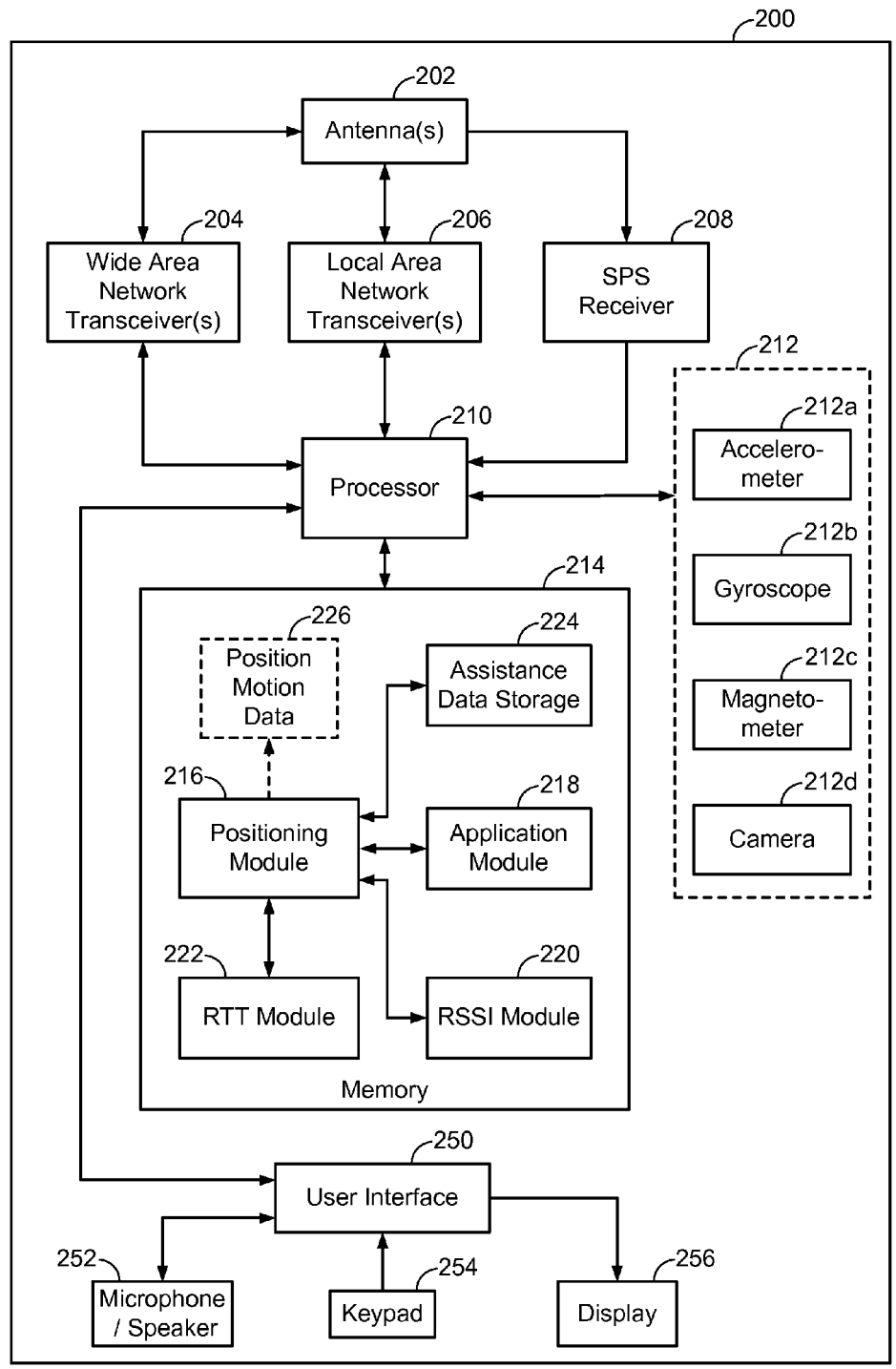
FIG. 2 is a schematic diagram of an example mobile device.

With reference now to FIG. 2, a schematic diagram illustrating various components of an example mobile device 200, which may be similar to the mobile device 108 of FIG. 1, is shown. For the sake of simplicity, the various features/components/functions illustrated in the box diagram of FIG. 2 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 2 may be further subdivided, or two or more of the features or functions illustrated in FIG. 2 may be combined. Additionally, one or more of the features or functions illustrated in FIG. 2 may be excluded.

As shown, the mobile device 200 may include one or more local area network transceivers 206 that may be connected to one or more antennas 202. The one or more local area network transceivers 206 comprise suitable devices, hardware, and/or software for communicating with and/or detecting signals to/from one or more of the LAN-WAPs 106a-e depicted in FIG. 1, and/or directly with other wireless devices within a network. In some embodiments, the local area network transceiver(s) 206 may comprise a WiFi (802.11x) communication transceiver suitable for communicating with one or more wireless access points; however, in some embodiments, the local area network transceiver(s) 206 may be configured to communicate with other types of local area networks, personal area networks (e.g., Bluetooth), etc. Additionally, any other type of wireless networking technologies may be used, for example, Ultra Wide Band, ZigBee, wireless USB, etc.

The mobile device 200 may also include, in some implementations, one or more wide area network transceiver(s) 204 that may be connected to the one or more antennas 202. The wide area network transceiver 204 may comprise suitable devices, hardware, and/or software for communicating with and/or detecting signals from one or more of, for example, the WAN-WAPs 104a-c illustrated in FIG. 1, and/or directly with other wireless devices within a network. In some implementations, the wide area network transceiver(s) 204 may comprise a CDMA communication system suitable for communicating with a CDMA network of wireless base stations. In some implementations, the wireless communication system may comprise other types of cellular telephony networks, such as, for example, TDMA, GSM, etc. Additionally, any other type of wireless networking technologies may be used, including, for example, WiMax (802.16), etc.

In some embodiments, an SPS receiver (also referred to as a global navigation satellite system (GNSS) receiver) 208 may also be included with the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the position of the mobile device 200 using, in part, measurements obtained by any suitable SPS procedure.

In some embodiments, the mobile device 200 may also include one or more sensors 212 coupled to a processor 210. For example, the sensors 212 may include motion sensors (also referred to as inertial sensors) to provide relative movement and/or orientation information which is independent of motion data derived from signals received by the wide area network transceiver(s) 204, the local area network transceiver(s) 206, and/or the SPS receiver 208. By way of example but not limitation, the motion sensors may include an accelerometer 212a, a gyroscope 212b, a geomagnetic (magnetometer) sensor 212c (e.g., a compass), an altimeter (e.g., a barometric pressure altimeter, not shown), and/or other sensor types. In some embodiments, the accelerometer 212a may be implemented based on micro-electro-mechanical-system (MEMS). Other types of accelerometers may be used in place of, or in addition to MEMS-based accelerometer. Additionally, a 3D accelerometer, comprising three perpendicularly placed accelerometers, may be implemented. In some embodiments, the gyroscope 212b may include a gyroscope based on MEMS technology, and may be a single-axis gyroscope, a double-axis gyroscope, or a 3-D gyroscope configured to sense motion about, for example, three orthogonal axes. Other types of gyroscopes may be used in place of, or in addition to MEMS-based gyroscope. In some embodiments, a magnetometer, configured to measure a magnetic field intensity and/or direction (and, thus, may be configured to measure absolute orientation with respect to the magnetic north) may also be implemented based on MEMS technology. Such MEMS-base magnetometers may be configured to detect motion caused by the Lorentz force produced by a current through a MEMS conductor. Other types of magnetometers may also be used. An altimeter may, for example, be configured to provide altitude data and thus may facilitate determining a floor in an indoor structure (e.g., a shopping mall) where the device may be located. Based on data representative of altitude measurements performed by the altimeter, navigation tasks, such as obtaining assistance data (including maps) for a particular floor in the indoor structure may be performed.

The output of the one or more sensors 212 may be combined in order to provide motion information. For example, estimated position of the mobile device 200 may be determined based on a previously determined position and the distance traveled from that previously determined position as determined from the motion information derived from measurements by at least one of the one or more sensors. In some embodiments, the estimated position of the mobile device may be determined based on probabilistic models (e.g., implemented through a particle filter realized using the mobile device 200) using the outputs of the one or more sensors 212. As further shown in FIG. 2, in some embodiments, the one or more sensors 212 may also include a camera 212d (e.g., a charge-couple device (CCD)-type camera), which may produce still or moving images (e.g., a video sequence) that may be displayed on a user interface device, such as a display or a screen.

The processor(s) (also referred to as a controller) 210 may be connected to the local area network transceiver(s) 206, the wide area network transceiver(s) 204, the SPS receiver 208, and/or the one or more sensors 212. The processor may include one or more microprocessors, microcontrollers, and/or digital signal processors that provide processing functions, as well as other calculation and control functionality. The processor 210 may also include storage media (e.g., memory) 214 for storing data and software instructions for executing programmed functionality within the mobile device. The memory 214 may be on-board the processor 210 (e.g., within the same IC package), and/or the memory may be external memory to the processor and functionally coupled over a data bus. Further details regarding an example embodiment of a processor or computation system, which may be similar to the processor 210, are provided below in relation to FIG. 6.

A number of software modules and data tables may reside in memory 214 and be utilized by the processor 210 in order to manage both communications with remote devices/nodes (such as the various access points depicted in FIG. 1), positioning determination functionality, and/or device control functionality. As will be described in greater details below, the processor 210 may also be configured, e.g., using software-based implementations, to determine whether verbal input from a user is required to determine position of location of a user, and in response to a determination that the verbal input from the user is required to determine the position of the location of the user to obtain verbal description data representative of one or more geographic features (e.g., landmarks) viewable by the user from the location of the user, identify at the mobile device the one or more of the geographic features from the obtained verbal description data, and determine, at the mobile device, positioning information for the location of the user based, at least in part, on the one or more geographic features identified from the verbal description data.

As illustrated in FIG. 2, memory 214 may include a positioning module 216, an application module 218, a received signal strength indicator (RSSI) module 220, and/or a round trip time (RTT) module 222. It is to be noted that the functionality of the modules and/or data structures may be combined, separated, and/or be structured in different ways depending upon the implementation of the mobile device 200. For example, the RSSI module 220 and/or the RTT module 222 may each be realized, at least partially, as a hardware-based implementation, and may thus include such devices as a dedicated antenna (e.g., a dedicated RTT and/or RSSI antenna), a dedicated processing unit to process and analyze signals received and/or transmitted via the antenna(s) (e.g., to determine signal strength of a received signals, determine timing information in relation to an RTT cycle), etc.

The application module 218 may be a process running on the processor 210 of the mobile device 200, which requests position information from the positioning module 216. Applications typically run within an upper layer of the software architectures, and may include indoor navigation applications, shopping applications, location aware service applications, etc. The positioning module 216 may derive the position of the mobile device 200 using information derived from various receivers and modules of the mobile device 200. For example, to determine the mobile device's position based on RTT measurements, reasonable estimates of processing time delays introduced by each access point may first be obtained and used to calibrate/adjust the measured RTTs. The measured RTTs may be determined by the RTT module 222, which can measure the timings of signals exchanged between the mobile device 200 and the access points to derive round trip time (RTT) information. In some embodiments, once measured, the RTT values may be passed to the positioning module 216 to assist in determining the position of the mobile device 200.

Other information that may be determined from communications received by the mobile device 200 (e.g., using one of its transceivers) includes the received signal power, which may be represented in the form of RSSI (determined using the RSSI module 220). The RSSI module 220 may also provide data regarding the signals to the positioning module 216. When using RSSI measurements to determine a mobile device's position, appropriate calibration/adjustment procedures may need to be performed. A determined position of the mobile device 200 may then be provided to the application module 218.

As further illustrated, the mobile device 200 may also include assistance data storage 224, where assistance data, such as map information, data records relating to location information in an area where the device is currently located, etc., which may have been downloaded from a remote server, is stored. In some embodiments, the mobile device 200 may also be configured to receive supplemental information that includes auxiliary position and/or motion data which may be determined from other sources (e.g., the sensors 212). Such auxiliary position data may be incomplete or noisy, but may be useful as another source of independent information for estimating the processing times of the WAPs. As illustrated in FIG. 2 (using dashed lines), mobile device 200 may optionally store auxiliary position/motion data 226 in memory which may be derived from information received from other sources as described below. Supplemental information may also include, but not be limited to, information that can be derived or based upon Bluetooth signals, beacons, RFID tags, and/or information derived from map (e.g., receiving coordinates from a digital representation of a geographical map by, for example, a user interacting with a digital map). Supplemental information may further include verbal input, provided by the user, in relation to viewable landmarks.

The mobile device 200 may further include a user interface 250 which provides any suitable interface systems, such as a microphone/speaker 252, keypad 254, and a display 256 that allows user interaction with the mobile device 200. The microphone/speaker 252 provides for voice communication services (e.g., using the wide area network transceiver(s) 204 and/or the local area network transceiver(s) 206). The keypad 254 comprises any suitable buttons for user input. The display 256 comprises any suitable display, such as, for example, a backlit LCD display, and may further include a touch screen display for additional user input modes.

Figure 3:
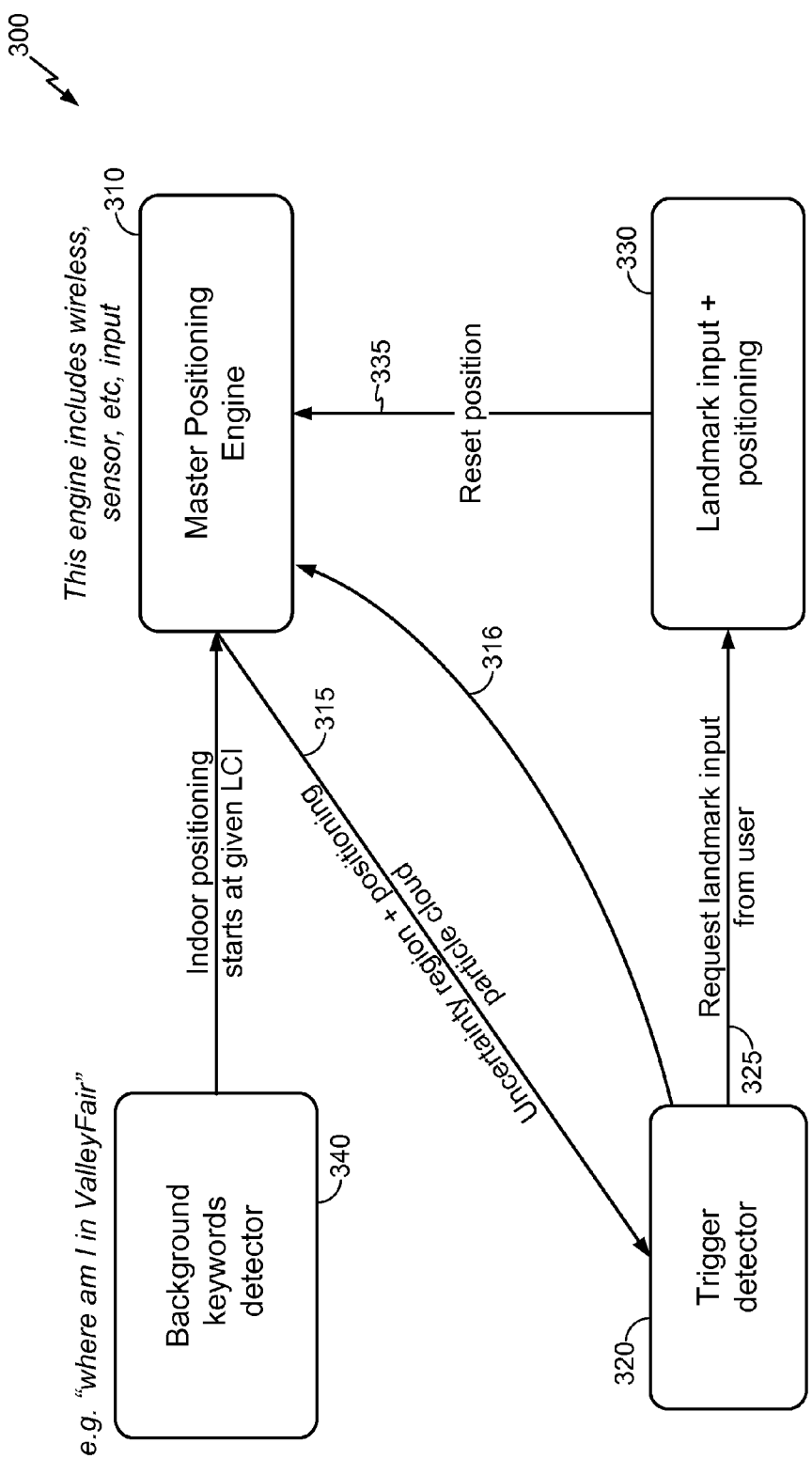
FIG. 3 is a diagram illustrating an example process flow of operations to perform location determination.

FIG. 3 is a diagram illustrating process flow 300 of location determination operations. In some implementations, the processing depicted in FIG. 3 may be configured to determine/estimate a location (of a receiver, or of some other device or person) based, at least in part, on verbal input such as verbal description data representative of one or more geographic features (landmarks, also referred to as points of interest, or POI's) viewable by a user. As shown in FIG. 3, the processing of FIG. 3 may include a master positioning engine process 310, which may be implemented on a mobile device, such as the mobile devices 108 and 200 of FIGS. 1 and 2, respectively, to determine the location of the mobile unit, or of some other device, based, for example, on signals received from remote servers and/or network elements. In some embodiments, the positioning engine process 310 may be configured to have functionality similar to that of the positioning module 216 depicted in FIG. 2. The positioning engine process 310 may thus be configured to receive signals from one or more remote transmitters such as any of the satellite and/or access points 102, 104, and/106 of FIG. 1 and to determine the receiving device's position based on multilateration techniques. For example, the positioning engine process 310 may be configured to determine RSSI or RTT parameters (e.g., using an RTT module, such as the RTT module 222 implemented in the example embodiment of the mobile device 200, and/or an RSSI module, such as the RSSI module 220 of FIG. 2) associated with received signals from one or more remote transmitters, and based on the known locations of the remote transmitters to determine the position of the mobile device. In another example, the positioning engine process 310 may be configured to determine a device's position based on signal profile identification techniques, e.g., by comparing determined parameter values of, for example, RSSI and/or RTT, to stored profiles that are associated with pre-determined positions.

In embodiments in which the positioning engine may determine a location based on such metrics as RSSI and/or RTT, measurements of signals received from one or more access points (each of which may be identified by an access point identifier, such as a unique MAC address associated with the access point), or from other types of transmitters, can be used to determine an estimate of the receiver's location (that receiver may be part of the positioning engine). For example, a database (which may be stored locally at a memory module housed in a device on which the positioning engine process 310 may be implemented), containing geographic locations, processing delays, power profiles, RTT profiles, and other such information for multiple access points with known geographical positions, may be accessed and relevant data (e.g., for particular transmitters/access points from which signals at the receiver were received) may be obtained. The database data so obtained may be used to facilitate location determination of the receiver. For example, the relative distances of the receiver receiving the signals from the transmitters/access points transmitting the signals may be determined based, at least in part, on known locations for those transmitters/access points stored on the accessed database, and an estimation of the location of the device may be computed/derived (e.g., using multilateration procedures, such as a trilateration procedure). As noted, in some embodiments, the position of the mobile device may be also be determined, for example, by comparing the actual measured values of signal strength (or RSSI) and RTT obtained from one or more access points, to stored profiles to identify a profile matching (approximately or precisely) the set of metric values determined by the mobile device. A location estimate associated with a matching stored profile may then be deemed to be an estimate of the current location of the receiver receiving the transmitters'/access points' signals.

In some embodiments, the positioning engine process 310 may be operating inside an indoor environment where satellite signals and/or signals from WWAN access points are generally more difficult to receive, and therefore the location of the positioning engine process 310 (or of a device on which the positioning engine process 310 operates) may be determined from signals received from one or more WLAN (e.g., WiFi devices, Bluetooth devices, femtocells, etc.) such as any of the WLAN access points 106a-e depicted in FIG. 1.

In some embodiments, the access points providing the signals based on which the positioning engine process 310 may perform location determination procedures may be part of a QUIPS™ (Qualcomm Indoor-Positioning System) implementation. In such embodiments, positioning determination may be performed as follows. Initially, the an LCI discovery process (an LCIs, or location context identifiers, refers to identifiers associated with such geographical areas as, for example, floors of a building) is performed. The discovery process causes transmission of a request to a server that identifies all LCIs, The discovery process results in determination of a coarse position of the receiver based, for example, on MAC id's that are seen/detected by the receiver. The Server communicates a set of candidate LCIs to the mobile with a list of access points. Following the LCI discovery process, an LCI disambiguation process is performed, where one or more criteria (such as the number of access points currently visible from each LCI, e.g., number of access points currently visible from each floor, maximum RSSI values from each LCI, median RSSI values from each LCI, etc.) may be applied to select an LCI from the candidate list. The chosen LCI represents a position estimate that is finer (ie., has a lower uncertainty) than the position estimate resulting from the LCI discovery process. Once an LCI from a set of candidate LCIs, has been chosen, a positioning process based on, for example, RSSI and/or RTT may be performed. For example, targeted scans of access point(s), limited to those associated with the selected LCI, provide the RSSI or RTTs required to determine a position approximation for the receiver.

As noted, in some embodiments, the positioning engine process 310 may be configured to determine location(s) according to probabilistic models, for example, via a particle filter implementation. Thus, in such embodiments, a position of a receiver (which may be part of a device implementing the positioning engine process) may be represented as a probability distribution. To model a receiver's movement within a physical indoor area, a probability distribution may be propagated around a schematic map modeling or representing the physical indoor area. To implement a probabilistic mechanism, a Bayesian or smoothing filter may be applied to location estimates or to a process to determine location estimates. Implementation of a probabilistic mechanism may include consideration of a current location or trajectory of a mobile device. Additionally or alternatively, a Kalman filter or a particle filter may be applied to location estimates or a process to determine location estimates. Other probabilistic mechanisms may also be used. In some implementations, a mobile device's location(s) or estimated locations may be represented by multiple particles. Each particle may represent a possible state or location of a mobile device. A combination of multiple particles (e.g., an average, a centroid, a mean, etc., with an error/uncertainty/confidence range that is derived from a combination of multiple particles) of a particle cloud may be considered at least one estimated location of a mobile device. One or more individual particles of multiple particles of a particle cloud may be considered at least one estimated location of a mobile device. In response to movement of a receiver (or a mobile device housing such a receiver), particles may be propagated according to a probability distribution. Particles may be propagated in accordance with a probability distribution further along a corridor, around a corner, by branching at an intersection, by taking a portal (e.g., a stairway, an escalator, an elevator, etc.) to a different floor, any combination thereof, etc.

Thus, a user carrying a mobile device may travel within an indoor environment. To provide the user with a location-based service, an estimated position of the mobile device within the indoor environment may be determined. As noted, a current estimated location of a mobile device may be determined, for example, via a position fix obtained using one or more location determination procedure, such as multilateration techniques, based on signals received from remote transmitters (e.g., access points) via one or more transceivers. For example, a particle filter implementation of the master positioning engine process 310 may process signals received from one or more access points, such as WiFi-based wireless access points (e.g., when operating in an indoor environment), via, for example, transceivers such as the transceiver 206 of the example device of FIG. 2. Based on such received signals, an initial location of the receiver/device may be determined. If the receiver cannot subsequently receive signals or other information from which the master positioning engine process 310 can determine a substantially accurate location (e.g., because the receiver may be traveling in an indoor environment where such signals are not available), estimates of the receiver's location may be determined based on the last position determined using signals/information from remote devices/systems, the distance traveled (as provided by various on-board sensors such as an accelerometer, gyroscope, etc.), and a determined orientation (determined using one or more of the measurements of the sensors coupled to the receiver). In some embodiments, determination of the location of a receiver by the positioning engine process 310 is further facilitated by assistance data (e.g., local maps) provided from an assistance data database. For example, the position of the receiver determined using signals/information from remote devices/systems, as well as estimated locations of the receiver determined using, for example, a particle filter implementation, may be provided in terms of a local coordinate system corresponding to local maps provided from the assistance data database. Furthermore, the determined estimated location of the system may be presented on such local maps obtained from the assistance data database.

Thus, using a location estimation procedure realized by, for example, a particle filter implementation, a number of particles may be established and permitted to move around an indoor area, from a determined starting point or position, based on one or more conditions or properties for a current epoch that extends for a given duration of time. By way of example only, hundreds of particles may be propagated for two to four seconds per epoch. Absent other indications, a likelihood that one or more particles are to move to any given point of a set of adjacent or equally-proximate points may be equal. However, given a layout of an indoor area, it may become apparent that a receiver device is actually more likely to be located at or moving to some points as compared to other points. Indoor areas, such as office buildings or malls, may include hallways and rooms, for example. In an office environment, rooms may include common rooms (e.g., a break room, a conference room, etc.) or individual rooms (e.g., a personal office, a cubicle, etc.) In such an office environment, a likelihood that a person is to move to a given point during a current epoch may depend, at least in part, on whether a given point is located within a hallway, a common room, or a private room/office. For example, users may generally be more likely to be traveling in a hallway than in a common room or more likely to be traveling in a common room than in a private room. Consequently, there may be a greater likelihood that a mobile device starting at a particular point of a grid of points is moving to a first point that is within a hallway than is moving to a second point that is within a private room.

With continued reference to FIG. 3, the master positioning engine process 310 may be configured to output positioning information 315 determined based on the various inputs received and processed by the positioning engine process 310. As noted, the various inputs obtained by the positioning engine process 310 may include signals from one or more access points, assistance data, measurement data from sensors coupled to the receiver, etc. The positioning engine process 310 may be configured to provide the positioning information in response to a request for location determination (e.g., a request sent by a user seeking to determine location of a receiver that the user is carrying), or may be provided automatically in response to occurrence of one or more conditions, e.g., time-based conditions such as determining location of the receiver at particular points of time, determining location of the receiver after a pre-determined period of time since the last time the receiver's location was determined, etc. For example, and as will be described in greater details below, the positioning engine process 310 may attempt to compute the position of the location of a user in response to a determination, for example, by a background keywords detector process 340 (also depicted in FIG. 3), that the user has requested that its location be determined.

In some embodiments, the positioning information provided by the master positioning engine process 310 may include determined/estimated location of a receiver and a value representative of an uncertainty, or error value, associated with the determined/estimated location. For example, when the location of the receiver can be ascertained substantially accurately (e.g., based on a sufficient number of signals received from one or more satellite and/or one or more access points), the uncertainty associated with the determined location may be low (e.g., actual location may be within a radius of, for example, ±10 m, ±1 m, ±0.5 m, or any other value corresponding to a low uncertainty associated with a determined location). When the accuracy of the determined position of the location is lower, e.g., because the determined location is based on signal received from an insufficient number of remote transmitters, a larger uncertainly value (e.g., ±100 m, ±1000 m, ±10,000 m, etc.) may be associated with the determined location. In some embodiments, the receiver's location and its associated uncertainty data generated by the positioning engine process may be represented as boundaries of some defined region (circular, or some regular or irregular geometric shape) within which the position of the receiver may be found. As noted, in some embodiments, the positioning engine process 310 may include a particle filter implementation and may thus produce a cloud of particles representative of possible locations of the receiver (e.g., determined based on a previous position determined by the particle filter, and/or supplemental data such as measurement data from one or more sensors coupled to the receiver). The possible locations in the particle cloud may each be associated with a probability value that may be indicative of the uncertainty associated with the respective particle position.

As further shown in FIG. 3, the determined location(s) and/or the associated uncertainty value(s) 315 are provided as input to a trigger detector process 320 configured to determine if additional data, for example, verbal input from a user, is required to determine position of the user's location. In some embodiments, the trigger detector may process the uncertainty data derived by the master positioning engine process 310 to determine whether or not verbal input from a user is required. For example, the trigger detector may perform a comparison of the uncertainty data associated with an initially determined position to pre-determined uncertainty/error threshold values. If the uncertainty value (or error value) exceeds the uncertainty threshold, a determination may be made that the uncertainty associated with the currently known determined/estimated position is too high, and therefore additional input, such as verbal input from a user, needs to be obtained. The trigger detector may consequently cause or initiate a procedure to request a user, via a user interface (e.g., an interface such as the interface 250 of the example device 200 of FIG. 2), to provide description data representative of one or more geographic features that are viewable by the user.

The trigger detector process 320 may also be configured to cause a procedure to request verbal input from a user (in order to facilitate location determination based, at least in part, on verbal input) for one or more of the following circumstances:
  a) When the number of AP's (e.g., WiFi AP's) providing signals based on which the positioning engine process may determine its positioning and uncertainty outputs is less than some pre-determined threshold values (e.g., fewer than three AP's);
  b) When the number of AP's providing signals that are received at the receiver with a high enough power level (i.e., their RSSI is not less than some pre-determined threshold) is less than some pre-determined threshold value (e.g., fewer than three AP's that provide signals whose corresponding RSSI at the receiver is equal to or exceeds some pre-determined RSSI threshold value);
  c) When the Horizontal Dilution Of Precision (HDOP) value calculated using the AP's in a current passive or active scan is worse than some pre-determined threshold.
  d) When an uncertainty region of the determined position, estimate based on a device's inertial sensors, is large (e.g., it exceeds some pre-determined threshold);
  e) When, in a particle filter implementation, the resultant particles are split into a bimodal distribution, e.g., half of the particles are in one corridor and another half in another corridor;
  f) When the distribution of the particles cloud, using a particle filter implementation, has certain attributes, e.g., when the standard deviation of the distribution exceeds some pre-determined value, when there are multiple clusters of particles, etc.; and/or
  g) When the dimensions of a particle cloud/cluster defined by derived particles exceed some dimension thresholds (e.g., a computed cloud diameter value exceeds some pre-determined threshold).

The trigger detector process 320 may be configured to trigger a request for verbal input for other situations and circumstances.

In some embodiments, the trigger detector process 320 may also be configured to determine amount of the verbal description data that is required to determine the position of the user's location. Such a determination may be based on position uncertainty/error values associated with the determined position outputted by the positioning engine process 310. The user may then be prompted to provide the verbal description data in accordance with the determined required amount of verbal description data. Some examples of verbal input amounts/levels required in various example situations include:
  a) In a particle filter implementation, if the computed particles are split between corridors, a request for just one (1) landmark input (one geographical feature to be provided by the user) may be required to enable choosing the right particle cloud and eliminate the remaining particles from consideration;
  b) When the number of AP's providing signals, based on which the positioning engine process 310 determines position information for the receiver receiving the signal, is too low (or the number of AP's whose corresponding received signals exceed some power requirement threshold is too low) a determination may be made that verbal input corresponding to at least three (3) landmarks should be requested from the user.
  c) When it is determined that the current estimated position is in a large open space, a determination may be made that verbal input for more than three (3) landmarks should be requested from the user.
  d) When a determination is made that the positioning master engine process 310 requires orientation information, a determination may be made that verbal input for landmarks appearing in at least two different directions (e.g., two opposing directions) should be requested from the user.

The trigger detector process 320 may be configured to determine an appropriate number of landmarks verbal input required for location determination for other types of situations and using other rules and schemes.

Thus, in circumstances where the user providing the input is the same one operating or carrying the device that includes the receiver receiving the signals from remote transmitters, the geographic features (e.g., landmarks) viewable by the user can enable the positioning engine process to reduce the uncertainty associated with the presently determined location for the receiver. For example, if the uncertainty computed for the receiver's location is ±100 m (e.g., because the receiver was able to receive signals from only one access point, thus resulting in a relatively large uncertainty), by obtaining verbal input corresponding to description of features viewable from the receiver (e.g., store fronts seen by a user standing in a shopping mall), the possible region in which the user may be located can be determined, and that possible region may correspond to an area within the area defined by the presently computed location of the receiver and the associated uncertainty value. In other words, the possible region determined based on verbal input may more finely define the region where the receiver may be located, and may have a smaller uncertainty than that computed based on signal and sensor measurement data. In some embodiments, the trigger detector process may be implemented as a module of the master positioning engine process 310 and/or may be housed on the same device (e.g., both the positioning engine process 310 and trigger detector process 320 may be implemented as modules, software and/or hardware, of a mobile device such as the devices 108 or 200 of FIGS. 1 and 2, respectively).

If a determination is made that verbal input from the user is not required, the processing of FIG. 3 may be terminated, or alternatively, the master position engine process 310 may continue to determine/estimate the receiver's location (present or subsequent locations) based, for example, on signals received by the receiver from remote transmitters (as indicated by arrow 316 shown in FIG. 3). On the other hand, if a determination is made that verbal input from the user is required to determine position of the user's location, then in response to that determination a request to provide such input, e.g., communicated via a voice-based and/or text-based user interface, is made to the user (as shown in operation 325), and a landmark input & positioning process 330 is performed. Particularly, in some embodiments, the landmark input & positioning process 330 may include obtaining verbal description data, representative of one or more geographic features (e.g., landmarks, such as store fronts located in a shopping mall) viewable by the user, which may either be a user carrying the device implementing the processing of FIG. 3, or a remotely located user communicating the verbal description data to the device performing the processing depicted in FIG. 3. For example, in some embodiments, the user's input of visual cues may be provided as a list of at least some of the landmarks he/she can see, and/or relationship information regarding those landmarks. For example, upon being prompted to provide verbal description data, the user may provide a verbal description such as "I see GAP on my right", "Apple Store on my left", etc. Such verbal description data may be provided as voice-input captured by a voice-based user input interface (such as the microphone/speaker 252 of the example device 200 shown in FIG. 2). Alternatively, user's text-based input can be used instead of, or in addition to, voice-based data.

The landmark input & positioning process 330 may thus further include operations to identify/determine from the user-provided verbal visual cues and relationship data (e.g., coarse geometry information) the geographic features indicated by the user. Particularly, the process 330 is configured to isolate and/or recognize from the verbal input which geographic features are being referred to in the verbal input, and what, if any, geographic relationship/directional cues are indicated. For example, for user verbal input such as "Apple Store on my left," the process 330 is configured to determine that the verbal description specifies that the geographic feature of an "Apple store" is seen by the user providing the data, and that the "Apple stored" is located to the user's left. Accordingly, in some embodiments, the process 330 may include implementation of a natural language processing (NLP) engine to analyze text or voice-based inputs (or other types of non-image based data) from the user (be it an operator of the mobile device through which such data is provided, or some remote user). The NLP engine may process input data using natural language processing procedures and techniques to analyze the content of user-provided input. The following are example operations that may be performed:

1) A Natural Language User Interfaces (LUI) receives the user's voice input or text-based input.
2) Speech recognition is performed for voice-based input.
3) Segmentation is performed on the user's input to separate it into words.
4) The segmented user input is analyzed to determine where particular words or phrases appear, to thus identify expression such as "I see," "we notice," etc.
5) Key words, such as geographic features including names of places of interest (POI), are identified. This identification procedure may be based on a vocabulary database, e.g. a list of POI names in the assistance database of a particular local. For example, if it is known that the user is located in a particular shopping mall, a user's processed input may be compared to a database containing the POI's at that locale to assess the similarity of the user's processed input to the list of POI's in the database.
6) Qualifying words/expressions associated with recognized POI names, e.g., expressions representative of relationships between various features, are identified. For example, words/expressions such as "from left," "from right," or "to the left," "to the right," or other such expressions indicating relationship or orientation information vis-à-vis the recognized POI's, are identified.

Having identified the one or more geographic features included in the user's verbal description data, the process 330 is configured to determine positioning information for the location of the user providing the verbal input. For example, in some embodiments, the geographic features identified from the verbal description data (e.g., "Apple store," "gap store," and/or other types of verbal description of geographic landmarks viewable by the user) are compared to assistance data (which may have previously been downloaded to the device implementing the processing of FIG. 3). Such assistance data may include data relating to geographic features in an area where the user known to be located, including a list of such geographic features, corresponding positioning information for such geographic features, and/or corresponding geographic orientations and/or positional relationships for the geographic features. For example, in some embodiments, the assistance data may include a map of a shopping mall specifying the various stores in the mall and their positional relationship to each other, a database of geographic features in the area where the user is located and position and orientation information for the geographic features, etc. The geographic features identified from the verbal description data provided by the user are thus compared to the assistance data to determine whether a match exists between one or more of the geographic features identified in the verbal description data and one or more of the data records included in the assistance data. As noted, in some embodiments, determination of the user's position (e.g., in real-time) based on verbal input corresponding to landmarks seen by the user and based on assistance data (e.g., map data) may be performed entirely locally at the mobile device that received the verbal input, without needing to communicate with a remote server. In such embodiments, any type of communication between the mobile device and a remote server is generally avoided and only assistance data that is already stored on the device (e.g., previously downloaded assistance data) is used, thus enabling expeditious position determination.

Figure 4A:
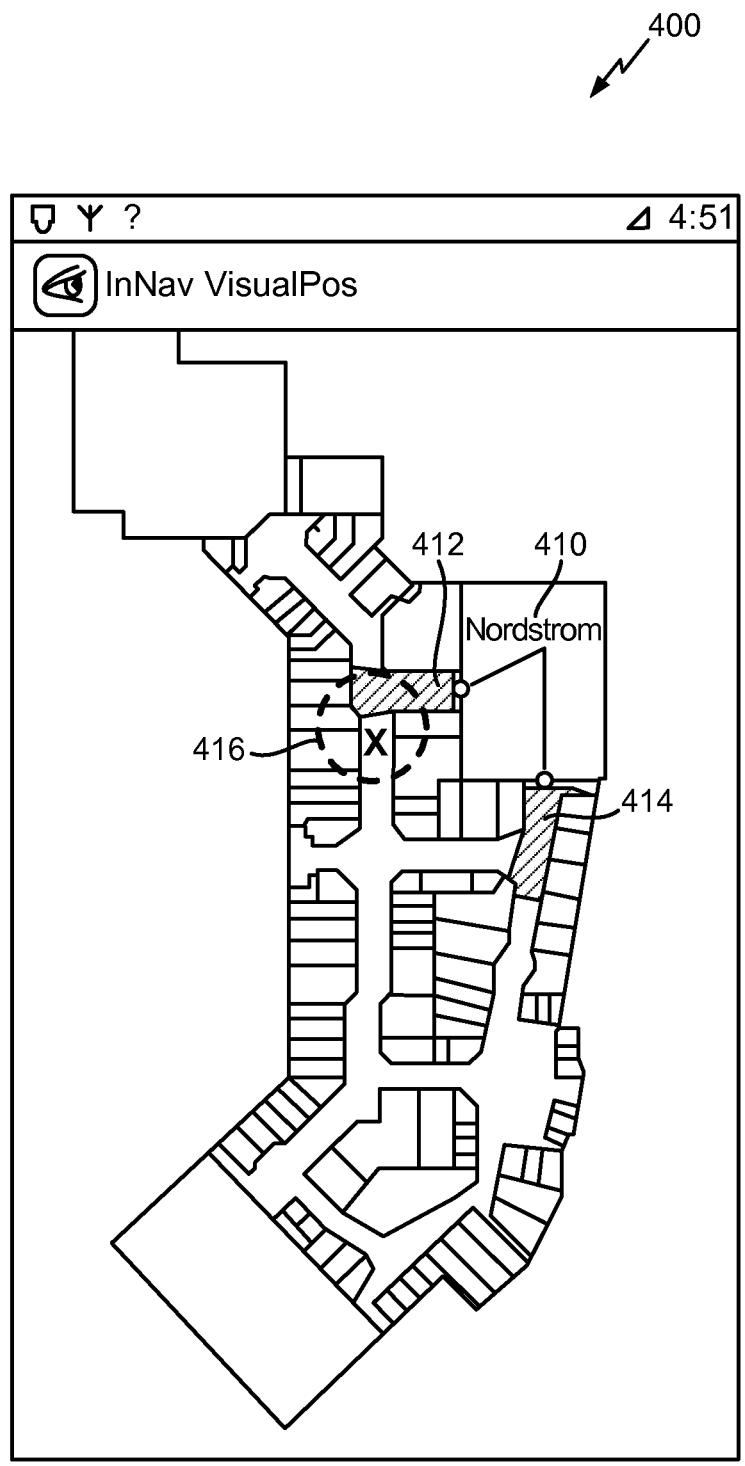
FIG. 4A is a diagram of an example map for a shopping mall that includes determined visibility regions defining possible locations where a user and/or device may be located.

When a particular geographic feature from the user's verbal description data is identified, a visibility region(s) corresponding to that geographic feature is determined/computed to thus define possible locations in which the user may be located, and a visibility map is generated. Such a visibility region(s) corresponds to all locations from which the geographic feature identified from the verbal description data is viewable. For example, with reference to FIG. 4A, a diagram of an example map 400 for a shopping mall that includes determined visibility regions is shown. Illustrated on the map 400 are visibility regions 412 and 414 (illustrated as shaded regions superimposed on the map) that were determined/computed in response to verbal description in which, in this example, the user specified that the store Nordstrom can be seen. For example, the user may have provided verbal description data such as "I see Nordstrom," from which the landmark input & positioning process 330 may have determined, using an NLP engine, that the store Nordstrom is viewable by the user. These possible visibility regions may be displayed on a user interface such as the display 256 of the user interface 250 of the example device 200 in FIG. 2. FIG. 4D, for example, is a diagram of a mobile device displaying a map (similar to the map 400 of FIGS. 4A-C) on which visibility regions, determined in response to verbal description data corresponding to geographic features seen by a user, are presented.

In some embodiments, for example for embodiments in which map-based assistance data, such as the example map 400 of FIG. 4, is used to facilitate determination of the position of the user's location, determination/computation of visibility regions may be performed as follows. Each of the geographic features, or points of interest (POI's, such as store fronts), may be represented on the map as a polygon. The polygons will generally have an accessor, such as the store fronts' entrances, whose relative position in the 2-D map is provided as coordinates (x,y). Thus, each of the store front polygons of the example map 400 will be associated with unique coordinates (x,y). In some embodiments, the orientation of each polygon represented in the map may be the orientation of the polygon side/edge that is closest to the polygon's accessor. That polygon edge will generally be the landmark (geographic feature) seen by the user. To compute the visibility region, the normal direction of the particular geographic feature landmark viewed by the user (and indicated in the user-provided verbal description data) is identified. The normal direction of the landmark may be defined as a vector that is perpendicular to the polygon side corresponding to store front viewed by the user, that extends away from that polygon side towards a hallway abutting the store front. The visibility region(s) are computed (e.g., in real time) by determining if a grid point residing in the hallway abutting the front of the geographic feature has a line-of-sight from the geographic feature. As noted, the front (e.g., store front) may be defined as the side of the polygon representation of the geographic feature that is closest to the accessor for the geographic feature. The grid points that are processed to determine if they have a line-of-sight to the fronts of the geographic features can be chosen based on the desired positioning resolution (e.g., every 1 foot, every 1 meter, etc.), which would thus limit the number of points on the map that need to be tested to determine if they have a line-of-site to the side(s) of the polygon that includes accessor(s).

Thus, in the example map 400, in response to the verbal description data "I see Nordstrom," polygon 410, which corresponds to the Nordstrom store in the map 400, is identified. As shown, the polygon 410 includes two accessors (entrances) on two of the polygon's sides abutting hallways. The shaded regions 412 and 414 are the determined visibility regions in which grid points encompassed by these regions have a direct line-of-sight to the sides of the polygon 400 that include accessors. It is to be noted that determination of the visibility regions may also be based on the positioning data initially determined through the positioning engine process 310. For example, if the positioning engine process 310 determined an initial possible region where the user (or a receiver) may be located (as noted, such an initial possible region may be defined by an initial estimated location and an uncertainty region), only grid point that fall within the initial possible region may need to be tested to see if they have a line-of-sight to a geographic feature (landmark) specified by the user. Thus, for example, if the positioning engine process 310 determined an initial estimated location identified by the 'x' appearing in FIG. 4A, and an uncertainty region defined by a dashed circle 416 centered at the 'x', only hallway grid points that are inside the dashed circle would need to be tested to see if they have a direct line-of-sight to the store front of the polygon 410. In that situation, only a small number of the grid points in the shaded region 412 would need to be checked, and the grid points in the shaded region 414 would not have to be tested at all. Thus, using the initial estimates determined by the positioning engine process 310 can reduce the resultant regions where the user may be located to the intersection (e.g., overlap) of the initial possible region computed by the positioning engine process and the visibility region computed by the landmark input & positioning process 330.

When the verbal description data provided by the user includes description for additional geographic features viewable by the user, the additional description data can be used to impose further constraints on the possible location. In some embodiments, the additional description data may have been provided by the user with the description data for the first geographic feature specified by the user, for example when it was determined (e.g., using the trigger detector process 320) that verbal description data for at least two geographic features needs to be provided (e.g., if the uncertainty region determined by the positioning engine process 310 was deemed to be large enough to require description data for at least two features). In some embodiments, a determination that additional description data for additional geographic feature may be needed may occur in response to a determination that the visibility region(s) determined by the process 330 do not provide sufficiently accurate positioning information for the location of the user. This determination may be performed by communicating the resultant visibility regions, and/or other positioning data produced from the processing performed by the landmark input & positioning process 330 on the first geographic feature, to the trigger detector process 320, and a subsequent determination by the trigger detector process 320 that the positioning information for the user's location is not sufficiently accurate. Alternatively, determination of the accuracy of the positioning information may be made by the process 330.

Figure 4B:
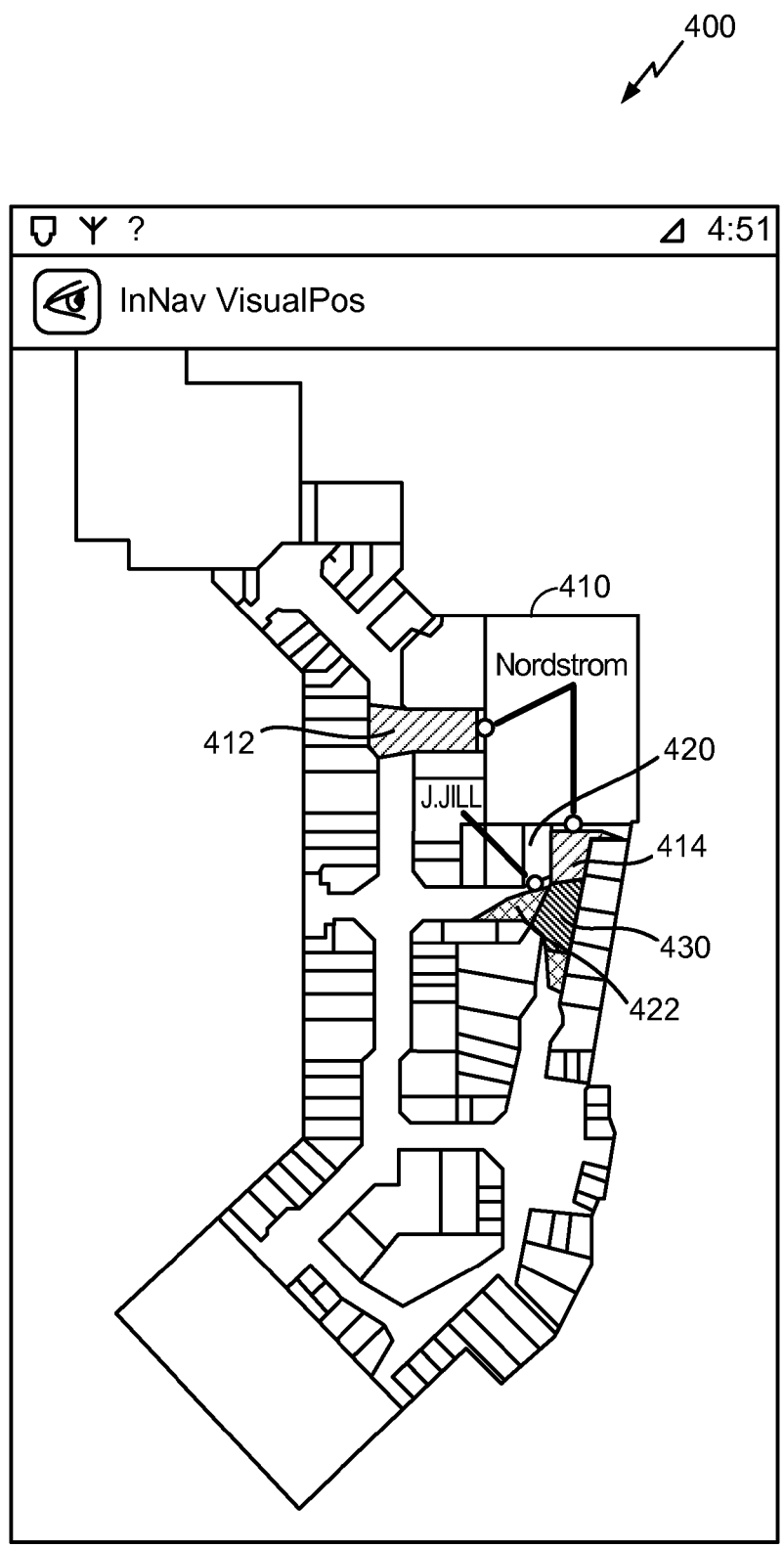
FIGS. 4B-C are additional diagrams of the map of FIG. 4A after further processing, based on additional verbal data, has been performed.
Figure 4C:
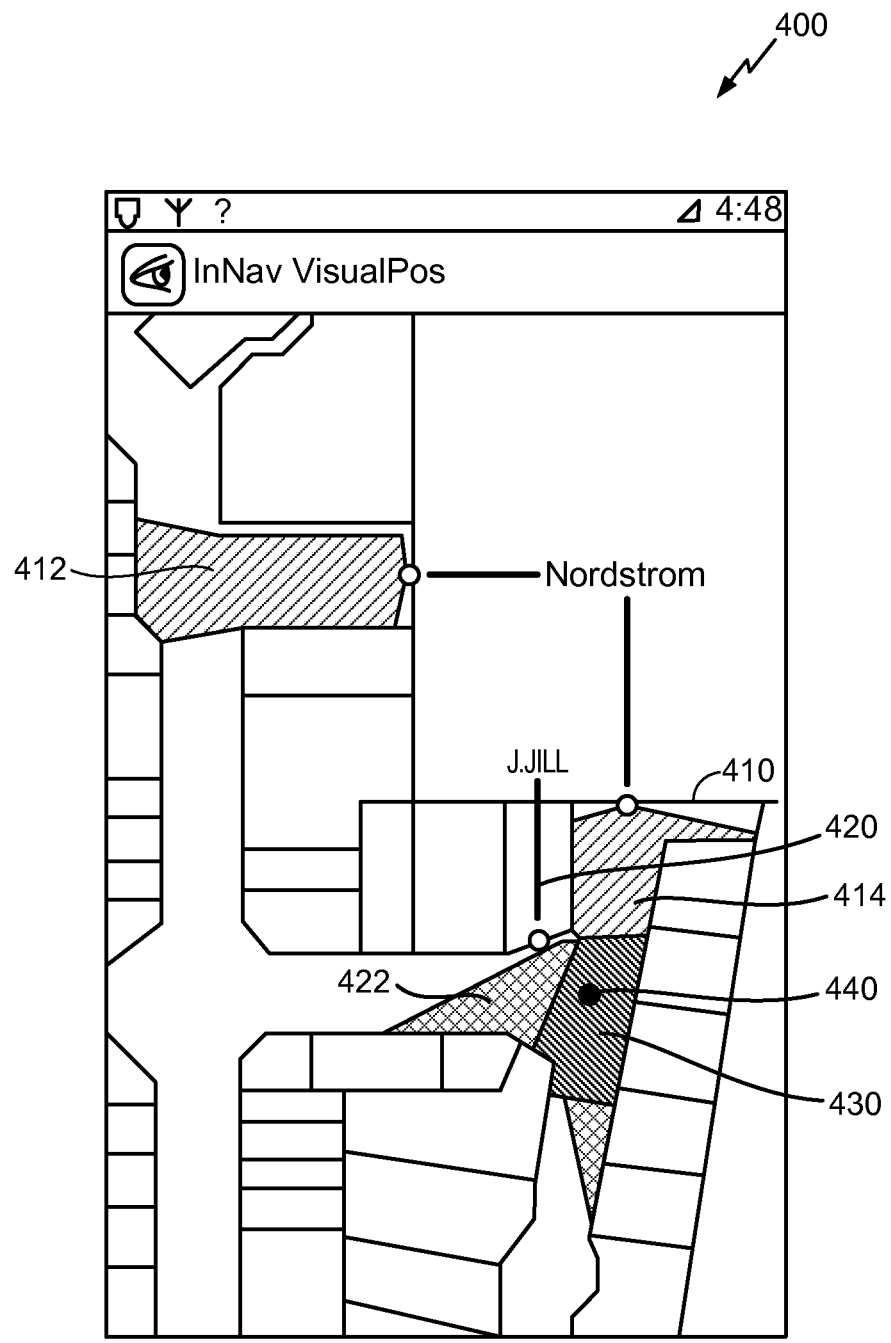
Figure 4D:
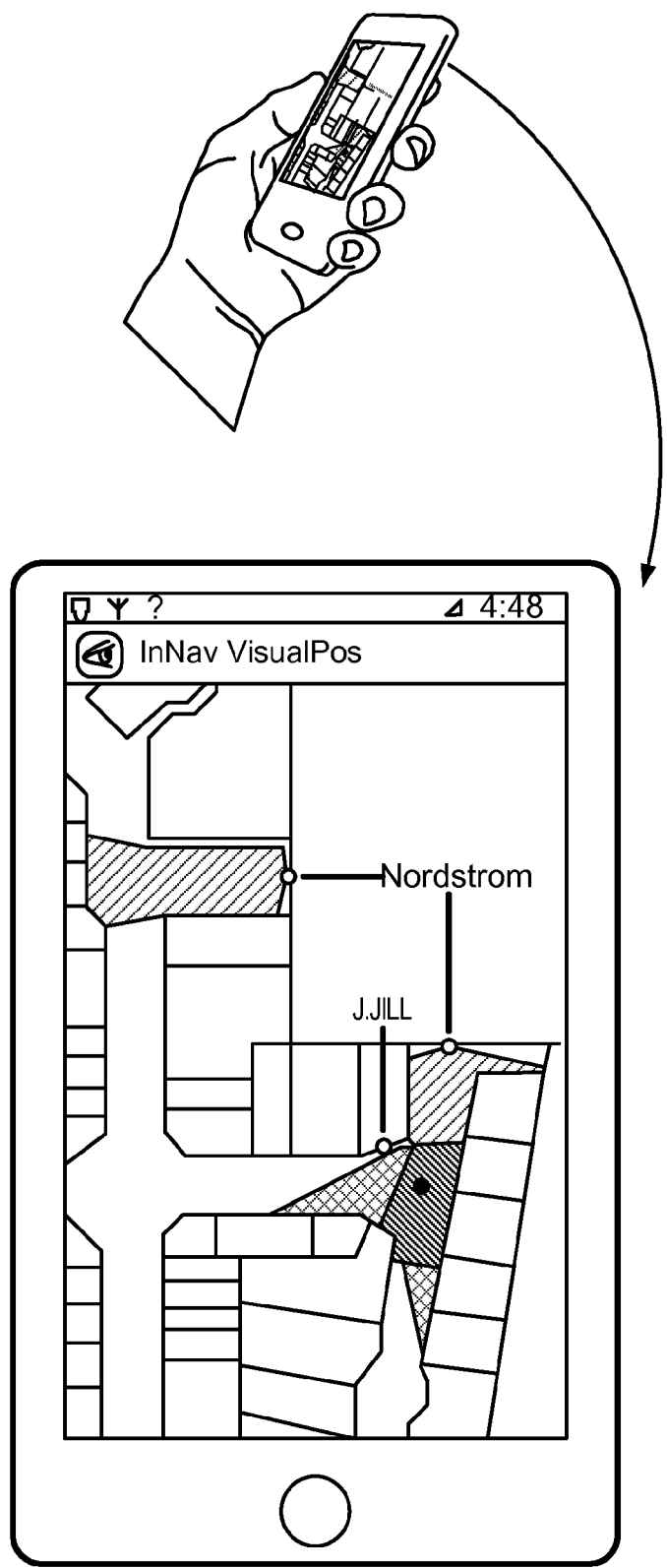
FIG. 4D is a diagram of a mobile device displaying a map on which visibility regions are presented.

FIG. 4B is a diagram of the map 400 after further processing, based on additional verbal description data provided by the user, has been performed. In the example of FIG. 4B, the user may have provided further verbal description data such as an expression "I see J.Jill." In response to this verbal description data, the landmark input & positioning process 330 may have performed processing similar to the processing described above, to thus identify (based on NLP processing) the geographic feature of the J.Jill store as being another landmark seen by the user, and to determine positioning information for the user's location based on this identified feature, e.g., to determine a visibility region(s) corresponding to this geographic feature. Thus, based on the additional verbal description data, a polygon 420 is identified as the polygon corresponding to the J.Jill stored specified in the verbal description data, and a visibility region 422 is determined/computed for this geographic feature. Because the user has indicate that he/she see both the Nordstrom and J.Jill stores, a resultant visibility region 430, which is the intersection of the visibility regions 414 and 422, is computed to represent the region containing grid points that have direct line-of-sight to both the Nordstrom and J.Jill landmarks (POIs).

If needed, the user may provide (on his/her own initiative or in response to being prompted) additional verbal description data to progressively refine the resultant region corresponding to the user's possible location. However, when there is not additional verbal input from the user, final estimated position of the user's location may be, in some embodiments, the center of any overlapping area resulting from the visibility regions determined for the geographic features identified from the verbal input provided by the user (as depicted for example, in FIG. 4C, where point 440 is determined to be the final estimated position of the location of the user).

Once the user's position has been determined/computed through the landmark input & positioning process 330, the determined position may be provided to the master positioning engine process 310. The positioning engine process 310 may then use the position determined from the process 330 as its current position for the purpose of determining/estimating/tracking subsequent positions (e.g., the resultant output of the process 330 may be used to reset the current position used by the master positioning engine process 310, as depicted by operation 335 in FIG. 3).

As noted, the processing 300 depicted in FIG. 3 may also include, in some implementations, a background keywords detector process 340 configured to identify from verbal data received at the mobile device (e.g., a mobile device such as the device 200 of FIG. 2, which may be implementing the processing of FIG. 3) a verbal expression indicating a request to determine the location of the user. In some embodiments, the verbal data indicating the user's request to determine the user's position, may include such verbal expressions as "where am I?," "where am I in ValleyFair?," "I am lost," or any other appropriate verbal utterance indicating a request to determine a user's position. The keywords detector process 340 may be implemented in a manner similar to the speech recognition operations of the landmark input & positioning process 330, and may thus include NLP-type processing performed on verbal input provided by the user. Such NLP-type processing may include performing speech recognition on voice-based input received at a Natural Language User Interface, segmenting the user's input to separate it into words, and analyzing the segmented user input to determine the verbal meaning of the received input.

Upon determination that the user wishes to determine his/her position, processing performed by the master positioning engine process 310 may begin to determine the user's position, e.g., based on signaling received from remote transmitters, sensors' measurements, etc. As noted, in circumstances where uncertainty associated with an estimated position is deemed to be too high, a determination may be made to request the user's verbal input, e.g., by providing prompts to the user to request verbal description data that may include a listing of landmarks viewable from the user's current location, to thus facilitate determination of the user's position.

Figure 5:
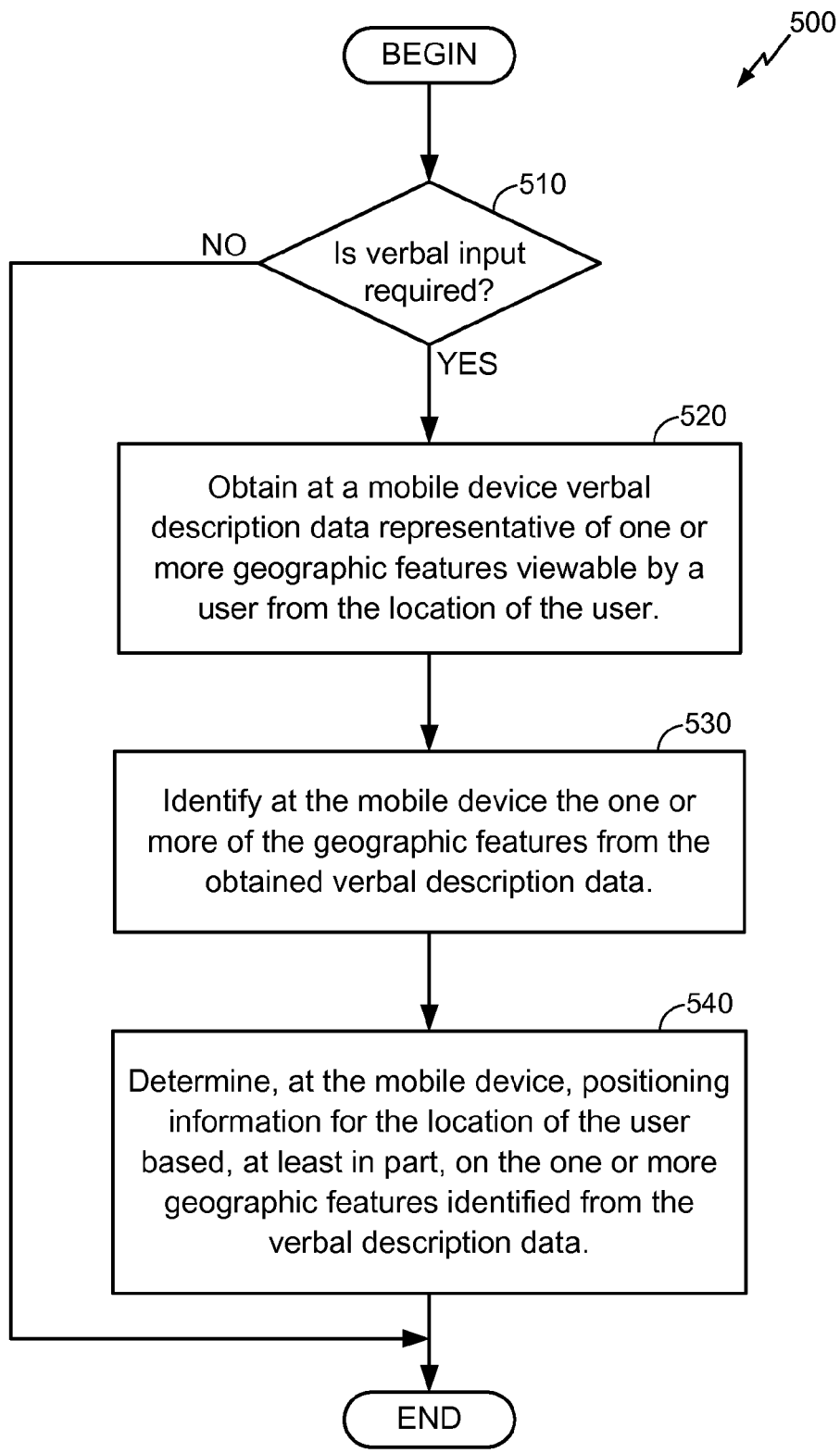
FIG. 5 is a flowchart of an example location determination procedure.

Further details regarding location determination operations described herein are provided with reference now to FIG. 5, showing a flow chart of an example location determination procedure 500. The procedure 500 includes determining 510 whether verbal input from a user is required to determine position of location of the user. For example, in some embodiments, the user's positioning may be initially determined (e.g., via a process such as the positioning engine process 310, shown in FIG. 3) based on signals from remote transmitters (WLAN AP's, WWAN AP's, satellite transmitters, etc.) received at a receiver, sensors' measurements, etc. If the initial positioning is deemed to be insufficiently accurate, a determination may be made that verbal input from the user is required to facilitate position determination of the user. Otherwise, the procedure 500 may terminate, and regular operations (including location determination via the positioning engine process 310) may continue.

Upon determination that verbal input from a user is required to determine the position of the user's location, verbal description data representative of one or more geographic features viewable by the user (e.g., landmarks, such as store front signs seen by the user from the user's current location) is obtained 520 at the mobile device. For example, in some embodiments, prompts to indicate to the user that verbal input of the landmarks seen by the user are required are generated and outputted to an output user interface on the mobile device (e.g., a visual indication outputted to a screen of the device, a voice-prompt generated using a text-to-voice generator and outputted to speakers of the mobile device, etc.) In response to the outputted prompts, the user may provide the verbal description data, representative of landmarks that the user currently sees, via a user-input interface (e.g., a keyboard to enter such description data in writing, a microphone to capture vocal utterances made by the user, etc.) In circumstances where the user whose position needs to be determined is situated remotely from the device on which the procedure 500 may be implemented, that user may communicate the verbal input from another device via a communication link established between that other remote device and the device on which the procedure 500 is implemented.

Having obtained the verbal description data, the one or more geographic features included in the verbal description data obtained from the user are identified 530 at the mobile device. As noted, in some embodiments, identification of what geographic features have been described by the user in the verbal description data may be performed via natural language processing operations implemented at the mobile device at which the procedure 500 is performed. Such operations may include speech-recognition operations, segmentation of the user's input to separate the input into words, and analysis of the segmented user input to determine the verbal meaning of the received input, etc.

Having identified the one or more geographic features included in the verbal description data obtained from the user, positioning information for the location of the user is determined 540 based, at least in part, on the identified one or more geographic features. For example, as noted, in some embodiments, the identified one or more geographic features may be compared to, and matched to, data records for assistance data downloaded to the device, e.g., a map of the area where the user is known to be located in. Based on positioning information included in the assistance data that corresponds to the one or more geographic features, the approximate or exact position of the user's location may be determined. For example, the one or more geographic feature included in the verbal description data may be matched to one or more locations in the map assistance data stored on the mobile device. Positioning information included in the assistance data may be used to determine a visibility map defining possible positions where the user may be located. Such a visibility map may include visibility regions corresponding to the verbal description data. As geographic features included in user-provided verbal description data are received, the resultant visibility map becomes progressively more refined because additionally received geographic features provide an increasing number of constraints on the visibility regions in the visibility map.

Figure 6:
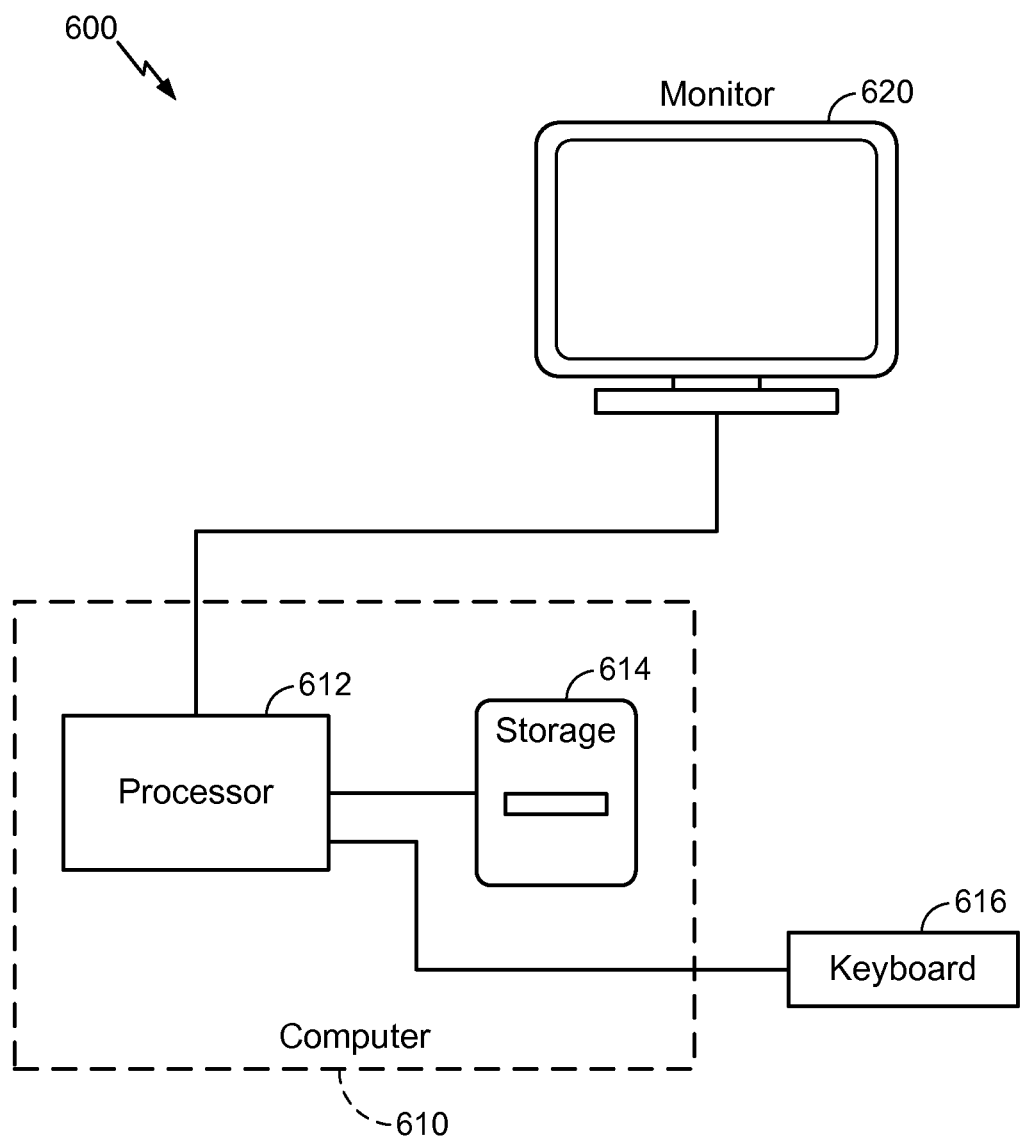
FIG. 6 is a schematic diagram of an example computing system.

Performing the procedures of determining whether verbal input is required to determine a user's location, and to determine the position of the user's location (with or without user-provided verbal input) may be facilitated by a processor-based computing system. With reference to FIG. 6, a schematic diagram of an example computing system 600 is shown. The computing system 600 may be housed in, for example, a handheld mobile device such as the devices 108 and 200 of FIGS. 1 and 2, respectively. The computing system 600 includes a processor-based device 610 such as a personal computer, a specialized computing device, and so forth, that typically includes a central processor unit 612. In addition to the CPU 612, the system includes main memory, cache memory and bus interface circuits (not shown). The processor-based device 610 may include a mass storage device 614, such as a hard drive and/or a flash drive associated with the computer system. The computing system 600 may further include a keyboard, or keypad, 616, and a monitor 620, e.g., a CRT (cathode ray tube) or LCD (liquid crystal display) monitor, that may be placed where a user can access them (e.g., a mobile device's screen).

The processor-based device 610 is configured to, for example, implement procedures to determine whether (and/or to what extent) verbal input from a user is required in order to determine position of the user's location, and/or to determine positioning information for a user's location with or without the use of such verbal input (e.g., input such as verbal description data representative of geographic features viewable by the user from the user's present location). The mass storage device 614 may thus include a computer program product that when executed on the processor-based device 610 causes the processor-based device to perform operations to facilitate the implementation of the above-described procedures. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 600. Other modules that may be included with the processor-based device 610 are speakers, a sound card, a pointing device, e.g., a mouse or a trackball, by which the user can provide input to the computing system 600. The processor-based device 610 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" may refer to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of storage media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver receiving signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
   determining at a mobile device whether verbal input from a user is required to determine a position of a location of the user; and
   in response to a determination that the verbal input from the user is required to determine the position of the location of the user:
   obtaining at the mobile device verbal description data representative of one or more geographic features viewable by the user from the location of the user,
   identifying at the mobile device the one or more geographic features from the obtained verbal description data, and
   determining, at the mobile device, positioning information for the location of the user based, at least in part, on the one or more geographic features identified from the verbal description data, wherein determining the positioning information comprises:

determining an initial possible region where the mobile device is located based on one or more of signals received from one or more remote transmitters, or data obtained from measurements performed by one or more sensors of the mobile device, the initial possible region defined by an initial location estimation within the initial possible region and an uncertainty value associated with the initial location estimation; and determining, when the uncertainty value associated with the initial location estimation is greater than an uncertainty threshold, for each of the one or more geographic features identified from the verbal description data a corresponding visibility region defining locations from which the respective each of the one or more geographic features is viewable by the user, and computing a resultant visibility intersection region derived as an intersection of the determined initial possible region, defined by the initial location estimation and the uncertainty value associated with the initial location estimation, and the respective visibility regions corresponding to the each of the one or more geographic features identified from the verbal description data.

2. The method of claim 1, further comprising:
identifying from verbal data received at the mobile device a verbal expression indicating a request to determine the location of the user.

3. The method of claim 1, wherein determining the positioning information for the location of the user comprises:
comparing at least one of the identified one or more geographic features to assistance data stored at the mobile device.

4. The method of claim 3, wherein the assistance data includes one or more of: geographic features available in one or more geographic areas, positioning information for the geographic features, or geographic orientations of the geographic features.

5. The method of claim 1, wherein the verbal description data comprises one or more of: text-based description data, or voice-based description data.

6. The method of claim 1, wherein identifying the one or more geographic features comprises:
identifying at least one verbal expression included with the verbal description data, the at least one verbal expression indicating inclusion of the one or more geographic features in the verbal description data.

7. The method of claim 1, wherein obtaining the verbal description data representative of the one or more geographic features comprises:
prompting the user to provide the verbal description data in response to the determination that the verbal input to determine the position of the location of the user is required; and
receiving from the user the verbal description data representative of the one or more geographic features.

8. The method of claim 7, wherein prompting the user to provide the verbal description data comprises:
determining amount of the verbal description data required to determine the position of the location of the user based on the uncertainty value associated with the initial location estimation; and
prompting the user to provide the verbal description data in accordance with the determined required amount of the verbal description data.

9. The method of claim 1, wherein the verbal description data comprises at least one of: the one or more geographic features viewable from the geographical location, or relationship between at least one of the one or more geographic features and another of the one or more geographic features.

10. The method of claim 1, wherein determining the positioning information for the location of the user comprises:
determining the respective visibility regions in which the location of the user could be located; and
progressively refining the identified visibility regions based on additionally received data corresponding to the location of the user.

11. The method of claim 1, wherein determining whether verbal input from the user is required to determine the position of the location of the user comprises:
determining whether verbal input from the user is required based on the uncertainty value associated with the initial location estimation.

12. The method of claim 11, wherein determining whether verbal input from the user is required based on the uncertainty value associated with the initial location estimation comprises one or more of:
determining whether number of access points from which signals to determine the initial location estimation are received is smaller than a pre-determined access point threshold;
determining whether a Horizontal Dilution Of Precision (HDOP) value calculated using the access points from which the signals are received is worse than a pre-determined HDOP threshold;
determining whether an uncertainty region, associated with the initial location estimation, computed based on data from one or more inertial sensors of the mobile device exceeds a pre-determined uncertainty region threshold; or
determining whether particles computed using a particle filter to determine the initial location estimation are split into a bimodal distribution.

13. The method of claim 1, wherein identifying at the mobile device the one or more geographic features from the obtained verbal description data comprises:
applying natural language processing (NLP) to the obtained verbal description data to identify the one or more geographic features.

14. The method of claim 1, wherein the each of the one or more geographic features is represented as a polygon in map data, stored on the mobile device for an area including the one or more geographic features, and wherein determining the corresponding visibility region for the each of the one or more geographic features comprises:
determining the corresponding visibility region defining one or more locations from which a side of the respective polygon, that includes data representative of an entrance to the respective each of the one or more geographic features, is viewable by the user.

15. A mobile device comprising:
one or more processors; and
storage media comprising computer instructions that, when executed on the one or more processors, cause operations comprising:
determining at the mobile device whether verbal input from a user is required to determine a position of a location of the user; and
in response to a determination that the verbal input from the user is required to determine the position of the location of the user:
obtaining at the mobile device verbal description data representative of one or more geographic features viewable by the user from the location of the user, identifying at the mobile device the one or more geographic features from the obtained verbal description data, and determining, at the mobile device, positioning information for the location of the user based, at least in part, on the one or more geographic features identified from the verbal description data, wherein determining the positioning information comprises:

determining an initial possible region where the mobile device is located based on one or more of signals received from one or more remote transmitters, or data obtained from measurements performed by one or more sensors of the mobile device, the initial possible region defined by an initial location estimation within the initial possible region and an uncertainty value associated with the initial location estimation; and determining, when the uncertainty value associated with the initial location estimation is greater than an uncertainty threshold, for each of the one or more geographic features identified from the verbal description data a corresponding visibility region defining locations from which the respective each of the one or more geographic features is viewable by the user, and computing a resultant visibility intersection region derived as an intersection of the determined initial possible region, defined by the initial location estimation and the uncertainty value associated with the initial location estimation, and the respective visibility regions corresponding to the each of the one or more geographic features identified from the verbal description data.

16. The device of claim 15, wherein the instructions cause further operations comprising:

identifying from verbal data received at the mobile device a verbal expression indicating a request to determine the location of the user.

17. The device of claim 15, wherein determining the positioning information for the location of the user comprises:

comparing at least one of the identified one or more geographic features to assistance data stored at the mobile device.

18. The device of claim 17, wherein the assistance data includes one or more of: geographic features available in one or more geographic areas, positioning information for the geographic features, or geographic orientations of the geographic features.

19. The device of claim 15, wherein the verbal description data comprises one or more of: text-based description data, or voice-based description data.

20. The device of claim 15, wherein identifying the one or more geographic features comprises:

identifying at least one verbal expression included with the verbal description data, the at least one verbal expression indicating inclusion of the one or more geographic features in the verbal description data.

21. The device of claim 15, wherein obtaining the verbal description data representative of the one or more geographic features comprises:

prompting the user to provide the verbal description data in response to the determination that the verbal input to determine the position of the location of the user is required; and receiving from the user the verbal description data representative of the one or more geographic features.

22. The device of claim 21, wherein prompting the user to provide the verbal description data comprises:

determining amount of the verbal description data required to determine the position of the location of the user based on the uncertainty value associated with the initial location estimation; and prompting the user to provide the verbal description data in accordance with the determined required amount of the verbal description data.

23. The device of claim 15, wherein the verbal description data comprises at least one of: the one or more geographic features viewable from the geographical location, or relationship between at least one of the one or more geographic features and another of the one or more geographic features.

24. The device of claim 15, wherein determining the positioning information for the location of the user comprises:

determining the respective visibility regions in which the location of the user could be located; and progressively refining the identified one or more visibility regions based on additionally received data corresponding to the location of the user.

25. The device of claim 15, wherein determining whether verbal input from the user is required to determine the position of the location of the user comprises:

determining whether verbal input from the user is required based on the uncertainty value associated with the initial location estimation.

26. The device of claim 25, wherein determining whether verbal input from the user is required based on the uncertainty value associated with the initial location estimation comprises one or more of:

determining whether number of access points from which signals to determine the initial location estimation are received is smaller than a pre-determined access point threshold;

determining whether a Horizontal Dilution Of Precision (HDOP) value calculated using the access points from which the signals are received is worse than a pre-determined HDOP threshold;

determining whether an uncertainty region, associated with the initial location estimation, computed based on data from one or more inertial sensors of the mobile device exceeds a pre-determined uncertainty region threshold; or determining whether particles computed using a particle filter to determine the initial location estimation are split into a bimodal distribution.

27. The device of claim 15, wherein identifying at the mobile device the one or more geographic features from the obtained verbal description data comprises:

applying natural language processing (NLP) to the obtained verbal description data to identify the one or more geographic features.

28. An apparatus comprising:

means for determining at a mobile device whether verbal input from a user is required to determine a position of a location of the user; and means, used in response to a determination that the verbal input from the user is required to determine the position of the location of the user, comprising:

means for obtaining at the mobile device verbal description data representative of one or more geographic features viewable by the user from the location of the user, means for identifying at the mobile device the one or more geographic features from the obtained verbal description data, and means for determining, at the mobile device, positioning information for the location of the user based, at least in part, on the one or more geographic features identified from the verbal description data, wherein the means for determining the positioning information comprises:
- means for determining an initial possible region where the mobile device is located based on one or more of signals received from one or more remote transmitters, or data obtained from measurements performed by one or more sensors of the mobile device, the initial possible region defined by an initial location estimation within the initial possible region and an uncertainty value associated with the initial location estimation; and
- means for determining, when the uncertainty value associated with the initial location estimation is greater than an uncertainty threshold, for each of the one or more geographic features identified from the verbal description data a corresponding visibility region defining locations from which the respective each of the one or more geographic features is viewable by the user, and means for computing a resultant visibility intersection region derived as an intersection of the determined initial possible region, defined by the initial location estimation and the uncertainty value associated with the initial location estimation, and the respective visibility regions corresponding to the each of the one or more geographic features identified from the verbal description data.

29. The apparatus of claim 28, further comprising:
means for identifying from verbal data received at the mobile device a verbal expression indicating a request to determine the location of the user.

30. The apparatus of claim 28, wherein the means for determining the positioning information for the location of the user comprise:
means for comparing at least one of the identified one or more geographic features to assistance data stored at the mobile device.

31. The apparatus of claim 30, wherein the assistance data includes one or more of: geographic features available in one or more geographic areas, positioning information for the geographic features, or geographic orientations of the geographic features.

32. The apparatus of claim 28, wherein the verbal description data comprises one or more of: text-based description data, or voice-based description data.

33. The apparatus of claim 28, wherein the means for identifying the one or more geographic features comprise:
means for identifying at least one verbal expression included with the verbal description data, the at least one verbal expression indicating inclusion of the one or more geographic features in the verbal description data.

34. The apparatus of claim 28, wherein the means for obtaining the verbal description data representative of the one or more geographic features comprise:
- means for prompting the user to provide the verbal description data in response to the determination that the verbal input to determine the position of the location of the user is required; and
- means for receiving from the user the verbal description data representative of the one or more geographic features.

35. The apparatus of claim 34, wherein the means for prompting the user to provide the verbal description data comprise:
- means for determining amount of the verbal description data required to determine the position of the location of the user based on the uncertainty value associated with the initial location estimation; and
- means for prompting the user to provide the verbal description data in accordance with the determined required amount of the verbal description data.

36. The apparatus of claim 28, wherein the verbal description data comprises at least one of: the one or more geographic features viewable from the geographical location, or relationship between at least one of the one or more geographic features and another of the one or more geographic features.

37. The apparatus of claim 28, wherein the means for determining the positioning information for the location of the user comprise:
- means for determining the respective visibility regions in which the location of the user could be located; and
- means for progressively refining the identified one or more visibility regions based on additionally received data corresponding to the location of the user.

38. The apparatus of claim 28, wherein the means for determining whether verbal input from the user is required to determine the position of the location of the user comprise:
means for determining whether verbal input from the user is required based on the uncertainty value associated with the initial location estimation.

39. The apparatus of claim 38, wherein the means for determining whether verbal input from the user is required based on the uncertainty value associated with the initial location estimation comprise one or more of:
- means for determining whether number of access points from which signals to determine the initial location estimation are received is smaller than a pre-determined access point threshold;
- means for determining whether a Horizontal Dilution Of Precision (HDOP) value calculated using the access points from which the signals are received is worse than a pre-determined HDOP threshold;
- means for determining whether an uncertainty region, associated with the initial location estimation, computed based on data from one or more inertial sensors of the mobile device exceeds a pre-determined uncertainty region threshold; or
- means for determining whether particles computed using a particle filter to determine the initial location estimation are split into a bimodal distribution.

40. The apparatus of claim 28, wherein the means for identifying at the mobile device the one or more geographic features from the obtained verbal description data comprise:
means for applying natural language processing (NLP) to the obtained verbal description data to identify the one or more geographic features.

41. A non-transitory processor readable media programmed with a set of instructions executable on a processor that, when executed, cause operations comprising:
- determining at a mobile device whether verbal input from a user is required to determine a position of a location of the user; and
- in response to a determination that verbal input from the user is required to determine the position of the location of the user:
  - obtaining at the mobile device verbal description data representative of one or more geographic features viewable by the user from the location of the user, identifying at the mobile device the one or more geographic features from the obtained verbal description data, and determining, at the mobile device, positioning information for the location of the user based, at least in part, on the one or more geographic features identified from the verbal description data, wherein determining the positioning information comprises:

determining an initial possible region where the mobile device is located based on one or more of signals received from one or more remote transmitters, or data obtained from measurements performed by one or more sensors of the mobile device, the initial possible region defined by an initial location estimation within the initial possible region and an uncertainty value associated with the initial location estimation; and determining, when the uncertainty value associated with the initial location estimation is greater than an uncertainty threshold, for each of the one or more geographic features identified from the verbal description data a corresponding visibility region defining locations from which the respective each of the one or more geographic features is viewable by the user, and computing a resultant visibility intersection region derived as an intersection of the determined initial possible region, defined by the initial location estimation and the uncertainty value associated with the initial location estimation, and the respective visibility regions corresponding to the each of the one or more geographic features identified from the verbal description data.

42. The processor readable media of claim 41, wherein the instructions cause further operations comprising:

identifying from verbal data received at the mobile device a verbal expression indicating a request to determine the location of the user.

43. The processor readable media of claim 41, wherein determining the positioning information for the location of the user comprises:

comparing at least one of the identified one or more geographic features to assistance data stored at the mobile device.

44. The processor readable media of claim 43, wherein the assistance data includes one or more of: geographic features available in one or more geographic areas, positioning information for the geographic features, or geographic orientations of the geographic features.

45. The processor readable media of claim 41, wherein the verbal description data comprises one or more of: text-based description data, or voice-based description data.

46. The processor readable media of claim 41, wherein identifying the one or more geographic features comprises:

identifying at least one verbal expression included with the verbal description data, the at least one verbal expression indicating inclusion of the one or more geographic features in the verbal description data.

47. The processor readable media of claim 41, wherein obtaining the verbal description data representative of the one or more geographic features comprises:

prompting the user to provide the verbal description data in response to the determination that the verbal input to determine the position of the location of the user is required; and receiving from the user the verbal description data representative of the one or more geographic features.

48. The processor readable media of claim 47, wherein prompting the user to provide the verbal description data comprises:

determining amount of the verbal description data required to determine the position of the location of the user based on the uncertainty value associated with the initial location estimation; and prompting the user to provide the verbal description data in accordance with the determined required amount of the verbal description data.

49. The processor readable media of claim 41, wherein the verbal description data comprises at least one of: the one or more geographic features viewable from the geographical location, or relationship between at least one of the one or more geographic features and another of the one or more geographic features.

50. The processor readable media of claim 41, wherein determining the positioning information for the location of the user comprises:

determining the respective visibility regions in which the location of the user could be located; and progressively refining the identified one or more visibility regions based on additionally received data corresponding to the location of the user.

51. The processor readable media of claim 41, wherein determining whether verbal input from the user is required to determine the position of the location of the user comprises:

determining whether verbal input from the user is required based on the uncertainty value associated with the initial location estimation.

52. The processor readable media of claim 51, wherein determining whether verbal input from the user is required based on the uncertainty value associated with the initial location estimation comprises one or more of:

determining whether number of access points from which signals to determine the initial location estimation are received is smaller than a pre-determined access point threshold;

determining whether a Horizontal Dilution Of Precision (HDOP) value calculated using the access points from which the signals are received is worse than a pre-determined HDOP threshold;

determining whether an uncertainty region, associated with the initial location estimation, computed based on data from one or more inertial sensors of the mobile device exceeds a pre-determined uncertainty region threshold; or determining whether particles computed using a particle filter to determine the initial location estimation are split into a bimodal distribution.

53. The processor readable media of claim 41, wherein identifying at the mobile device the one or more geographic features from the obtained verbal description data comprises:

applying natural language processing (NLP) to the obtained verbal description data to identify the one or more geographic features.

* * * * *